(12) United States Patent
Bravi et al.

(10) Patent No.: US 9,838,117 B2
(45) Date of Patent: Dec. 5, 2017

(54) BIAS ERROR CORRECTION IN AN OPTICAL COHERENT TRANSPONDER

(71) Applicant: Fujitsu Network Communications, Inc., Richardson, TX (US)

(72) Inventors: Emilio Bravi, Hillsdale, NJ (US); Qian Liang, Allen, TX (US)

(73) Assignee: Fujitsu Limited, Kawasaki (JP)

( * ) Notice: Subject to any disclaimer, the term of this patent is extended or adjusted under 35 U.S.C. 154(b) by 29 days.

(21) Appl. No.: 15/149,667

(22) Filed: May 9, 2016

(65) Prior Publication Data

US 2017/0324474 A1    Nov. 9, 2017

(51) Int. Cl.
*H04B 10/07* (2013.01)
*H04B 10/079* (2013.01)
*H04B 10/40* (2013.01)
*H04J 14/02* (2006.01)

(52) U.S. Cl.
CPC ....... *H04B 10/07955* (2013.01); *H04B 10/40* (2013.01); *H04J 14/02* (2013.01)

(58) Field of Classification Search
None
See application file for complete search history.

(56) References Cited

U.S. PATENT DOCUMENTS

| 9,654,226 | B1* | 5/2017 | Bhandare | H04B 10/58 |
| 2003/0147577 | A1* | 8/2003 | Kataoka | H04B 10/505 |
| | | | | 385/3 |
| 2007/0230617 | A1* | 10/2007 | Tao | G02F 1/0123 |
| | | | | 375/302 |
| 2012/0251104 | A1* | 10/2012 | Oberland | G02F 1/0123 |
| | | | | 398/38 |
| 2016/0099776 | A1* | 4/2016 | Nakashima | H04B 10/50572 |
| | | | | 398/186 |
| 2016/0112138 | A1* | 4/2016 | Alfiad | H04B 10/50572 |
| | | | | 398/182 |

* cited by examiner

*Primary Examiner* — Tesfaldet Bocure
(74) *Attorney, Agent, or Firm* — Baker Botts L.L.P.

(57) ABSTRACT

Systems and methods for detecting and correcting bias errors in optical coherent transponders are disclosed. An "outer" modulator in a transponder may, when properly biased, produce a phase offset of π/2 radians between in-phase and quadrature components of the optical signals transmitted in optical modulation formats by the transponder. The method may include providing input to a transponder to produce a periodic (and generally sinusoidal) output signal, measuring (using an optical power meter) the optical power of positive and negative harmonics of the signal while varying the amount of skew introduced by a de-skewing filter in the transponder, and determining that a curve representing the measurements performed on the positive harmonics and a curve representing the measurements performed on the negative harmonics are not orthogonal. The method may include adjusting the bias voltage of the modulator to make the two curves orthogonal, thus eliminating the bias error.

20 Claims, 11 Drawing Sheets

BIAS ERROR CORRECTION IN AN OPTICAL COHERENT TRANSPONDER

BACKGROUND

Field of the Disclosure

The present disclosure relates generally to optical communication networks and, more particularly, to systems and methods for detecting and correcting bias errors in optical coherent transponders.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), pulse-amplitude modulation (PAM), and quadrature amplitude modulation (QAM).

Optical networks may also include various optical elements, such as amplifiers, dispersion compensators, multiplexer/demultiplexer filters, wavelength selective switches (WSS), optical switches, couplers, etc. to perform various operations within the network. In particular, optical networks may include optical-electrical-optical (O-E-O) regeneration when the reach of an optical signal is limited and reconfigurable optical add-drop multiplexers (ROADMs).

In systems that convey information in the form of optical signals in optical coherent modulation formats (e.g., DP 16-QAM, DP-QPSK, etc.), the performance of the system is dependent on the relative phases of the In-phase/Quadrature (I/Q) components. For example, the performance is dependent on whether or not the optical I/Q components are perfectly orthogonal and on whether the delay between the electrical I/Q components is optimized. Developers of components for optical networks might wish to measure the delay between the components of such signals, which is typically referred to as "skew", and to modify the design of the components to compensate for at least some of the skew. Bias errors in the modulators in the optical coherent transponders can contribute to non-orthogonality. Existing skew measurement methods and measurements of I/Q non-orthogonality are not very accurate for complex modulation formats (such as 16-QAM), and the equipment needed to perform the measurements can be very expensive. For example, some existing skew measurement techniques rely on the use of expensive Optical Modulation Analyzers (OMAs). Similarly, some existing skew-compensation techniques rely on calibrated skew measurements of the type made by OMAs.

SUMMARY

In one aspect, a disclosed method is for detecting a bias error in an optical coherent transponder. The method may include performing a first plurality of measurements of optical power of positive harmonics of an optical signal transmitted in an optical modulation format by the optical coherent transponder, each measurement being performed while a respective different amount of skew is introduced into the optical signal by a de-skewing filter of the optical coherent transponder. The method may include performing a second plurality of measurements of optical power of negative harmonics of the optical signal, each measurement being performed while a respective different amount of skew is introduced into the optical signal by a de-skewing filter of the optical coherent transponder. The method may also include detecting, dependent on the first plurality of measurements and the second plurality of measurements, a bias error in a modulator in the optical coherent transponder that when correctly biased produces a constant phase offset of $\pi/2$ radians between in-phase and quadrature components of the optical signals transmitted by the optical coherent transponder. Detecting the bias error may include determining that a curve representing the first plurality of measurements and a curve representing the second plurality of measurements are not orthogonal.

In any of the disclosed embodiments, determining that the curve representing the first plurality of measurements and the curve representing the second plurality of measurements are not orthogonal may include identifying a first minimum optical power value obtained during the first plurality of measurements, determining a first amount of skew that was introduced by the de-skewing filter when the first minimum optical power value was obtained, identifying a second minimum optical power value obtained during the second plurality of measurements, determining a second amount of skew that was introduced by the de-skewing filter when the second minimum optical power value was obtained, and determining that the first amount of skew and the second amount of skew differ by an amount other than an amount representing a one-symbol delay in the optical modulation format.

In any of the disclosed embodiments, the method may include changing, in response to detecting the bias error in the modulator, a bias voltage of the modulator. Changing the bias voltage of the modulator reduces the bias error in the optical coherent transponder.

In any of the disclosed embodiments, the method may include changing, in response to detecting the bias error in the modulator, a bias voltage of the modulator. Changing the bias voltage of the modulator may include changing a value of a configurable operating parameter of the modulator.

In any of the disclosed embodiments, the method may include determining, dependent on the first plurality of measurements and the second plurality of measurements, a measurement of the bias error in the modulator.

In any of the disclosed embodiments, the method may include changing, in response to detecting the bias error in the modulator, a bias voltage of the modulator. The method may also include performing, subsequent to changing the bias voltage, a third plurality of measurements of optical power of positive harmonics of an optical signal transmitted in an optical modulation format by the optical coherent transponder, each measurement being performed while a respective different amount of skew is introduced into the optical signal by a de-skewing filter of the optical coherent transponder; performing, subsequent to changing the bias voltage, a fourth plurality of measurements of optical power of negative harmonics of the optical signal, each measurement being performed while a respective different amount of skew is introduced into the optical signal by a de-skewing filter of the optical coherent transponder; and detecting, dependent on the third plurality of measurements and the fourth plurality of measurements, that the bias error in the modulator has been corrected. Detecting that the bias error in the modulator has been corrected includes determining that a curve representing the third plurality of measurements and a curve representing the fourth plurality of measurements are orthogonal.

In any of the disclosed embodiments, performing the first plurality of measurements may include taking a first measurement of optical power of a positive harmonic of an optical signal transmitted by the optical coherent transponder while a first amount of skew is introduced by the de-skewing filter, and for each successive one of the first plurality of measurements, varying the amount of skew introduced by the de-skewing filter by a fixed increment that is dependent on the minimum resolution by which the amount of skew is changeable. Performing the plurality of measurements may include varying the amount of skew introduced by the de-skewing filter to include amounts of skew over a range of values that represents two symbols of delay in the optical modulation format.

In any of the disclosed embodiments, the optical signal transmitted by the optical coherent transponder may be a sinusoidal signal or a combination of sinusoidal signals, and the method may further include filtering the optical signal to isolate the positive harmonics of the optical signal prior to performing the first plurality of measurements and filtering the optical signal to isolate the negative harmonics of the optical signal prior to performing the second plurality of measurements.

In any of the disclosed embodiments, performing the first plurality of measurements and the second plurality of measurements may include taking measurements of optical power using an optical power meter.

In a further aspect, a system may include circuitry to receive optical signals transmitted in an optical modulation format by an optical coherent transponder under test. The system may also include an optical power meter including circuitry to perform a first plurality of measurements of optical power of positive harmonics of an optical signal transmitted by the optical coherent transponder, each measurement to be performed while a respective different amount of skew is introduced into the optical signal by a de-skewing filter of the optical coherent transponder, and to perform a second plurality of measurements of optical power of negative harmonics of the optical signal, each measurement to be performed while a respective different amount of skew is introduced into the optical signal by a de-skewing filter of the optical coherent transponder. The system may further include a bias error corrector including circuitry to detect, dependent on the first plurality of measurements and the second plurality of measurements, a bias error in a modulator in the optical coherent transponder that when correctly biased produces a constant phase offset of π/2 radians between in-phase and quadrature components of the optical signals transmitted by the optical coherent transponder. The bias error detector may include circuitry to determine that a curve to represent the first plurality of measurements and a curve to represent the second plurality of measurements are not orthogonal.

In any of the disclosed embodiments, to determine that the curve to represent the first plurality of measurements and the curve to represent the second plurality of measurements are not orthogonal, the bias error corrector may further include circuitry to identify a first minimum optical power value obtained during the first plurality of measurements, to determine a first amount of skew that was introduced by the de-skewing filter when the first minimum optical power value was obtained, to identify a second minimum optical power value obtained during the second plurality of measurements, to determine a second amount of skew that was introduced by the de-skewing filter when the second minimum optical power value was obtained, and to determine that the first amount of skew and the second amount of skew differ by an amount other than an amount to represent a one-symbol delay in the optical modulation format.

In any of the disclosed embodiments, the bias error corrector may further include circuitry to change a bias voltage of the modulator in response to detection of the bias error in the modulator, and the change may effect a reduction of the bias error in the optical coherent transponder.

In any of the disclosed embodiments, the bias error corrector may further include circuitry to change a bias voltage of the modulator in response to detection of the bias error in the modulator, including circuitry to change a value of a configurable operating parameter of the modulator.

In any of the disclosed embodiments, the bias error corrector may further include circuitry to determine, dependent on the first plurality of measurements and the second plurality of measurements, a measurement of the bias error in the modulator.

In any of the disclosed embodiments, the bias error corrector may include circuitry to change, in response to detection of the bias error in the modulator, a bias voltage of the modulator. The optical power meter may further include circuitry to perform, subsequent to the change to the bias voltage, a third plurality of measurements of optical power of positive harmonics of an optical signal transmitted in an optical modulation format by the optical coherent transponder, each measurement to be performed while a respective different amount of skew is introduced into the optical signal by a de-skewing filter of the optical coherent transponder, and to perform, subsequent to the change to the bias voltage, a fourth plurality of measurements of optical power of negative harmonics of the optical signal, each measurement to be performed while a respective different amount of skew is introduced into the optical signal by a de-skewing filter of the optical coherent transponder. The bias error corrector may further include circuitry to detect, dependent on the third plurality of measurements and the fourth plurality of measurements, that the bias error in the modulator has been corrected, including circuitry to determine that a curve to represent the third plurality of measurements and a curve to represent the fourth plurality of measurements are orthogonal.

In any of the disclosed embodiments, to perform the first plurality of measurements, the optical power meter may include circuitry to take a first measurement of optical power of a positive harmonic of an optical signal transmitted by the optical coherent transponder while a first amount of skew is introduced by the de-skewing filter and, for each successive one of the first plurality of measurements, vary the amount of skew introduced by the de-skewing filter by a fixed increment that is dependent on the minimum resolution by which the amount of skew is changeable. The amount of skew introduced by the de-skewing filter may be varied over a range of values that represents two symbols of delay in the optical modulation format.

In any of the disclosed embodiments, the optical signal transmitted by the optical coherent transponder may be a sinusoidal signal or a combination of sinusoidal signals, and the system may further include one or more filters to isolate the positive harmonics of the optical signal prior to performance of the first plurality of measurements and to isolate the negative harmonics of the optical signal prior to performance of the second plurality of measurements.

In any of the disclosed embodiments, the optical power meter may include an optical spectrum analyzer.

In yet another aspect, a disclosed method is for correcting a bias error in an optical coherent transponder. The method may include performing a first plurality of measurements of optical power of positive harmonics of an optical signal transmitted in an optical modulation format by the optical coherent transponder, each measurement being performed while a respective different amount of skew is introduced into the optical signal by a de-skewing filter of the optical coherent transponder. The method may include performing a second plurality of measurements of optical power of negative harmonics of the optical signal, each measurement being performed while a respective different amount of skew is introduced into the optical signal by a de-skewing filter of the optical coherent transponder. The method may also include detecting, dependent on the first plurality of measurements and the second plurality of measurements, a bias error in a modulator in the optical coherent transponder that when correctly biased produces a constant phase offset of $\pi/2$ radians between in-phase and quadrature components of the optical signals transmitted by the optical coherent transponder; determining a bias voltage value for the modulator that corrects the bias error; and changing the bias voltage of the modulator to the determined bias voltage value.

In any of the disclosed embodiments, determining the bias voltage value for the modulator that corrects the bias error may include changing, in response to detecting the bias error in the modulator, an initial value of the bias voltage of the modulator to a modified bias voltage value. The method may include performing, subsequent to changing the initial value of the bias voltage of the modulator to a modified bias voltage value, a third plurality of measurements of optical power of positive harmonics of an optical signal transmitted in an optical modulation format by the optical coherent transponder, each measurement being performed while a respective different amount of skew is introduced into the optical signal by a de-skewing filter of the optical coherent transponder, and performing, subsequent to changing the initial value of the bias voltage of the modulator to a modified bias voltage value, a fourth plurality of measurements of optical power of negative harmonics of the optical signal, each measurement being performed while a respective different amount of skew is introduced into the optical signal by a de-skewing filter of the optical coherent transponder. The method may also include detecting, dependent on the third plurality of measurements and the fourth plurality of measurements, that the bias error in the modulator has been corrected. Detecting that the bias error in the modulator has been corrected may include determining that a curve representing the third plurality of measurements and a curve representing the fourth plurality of measurements are orthogonal.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
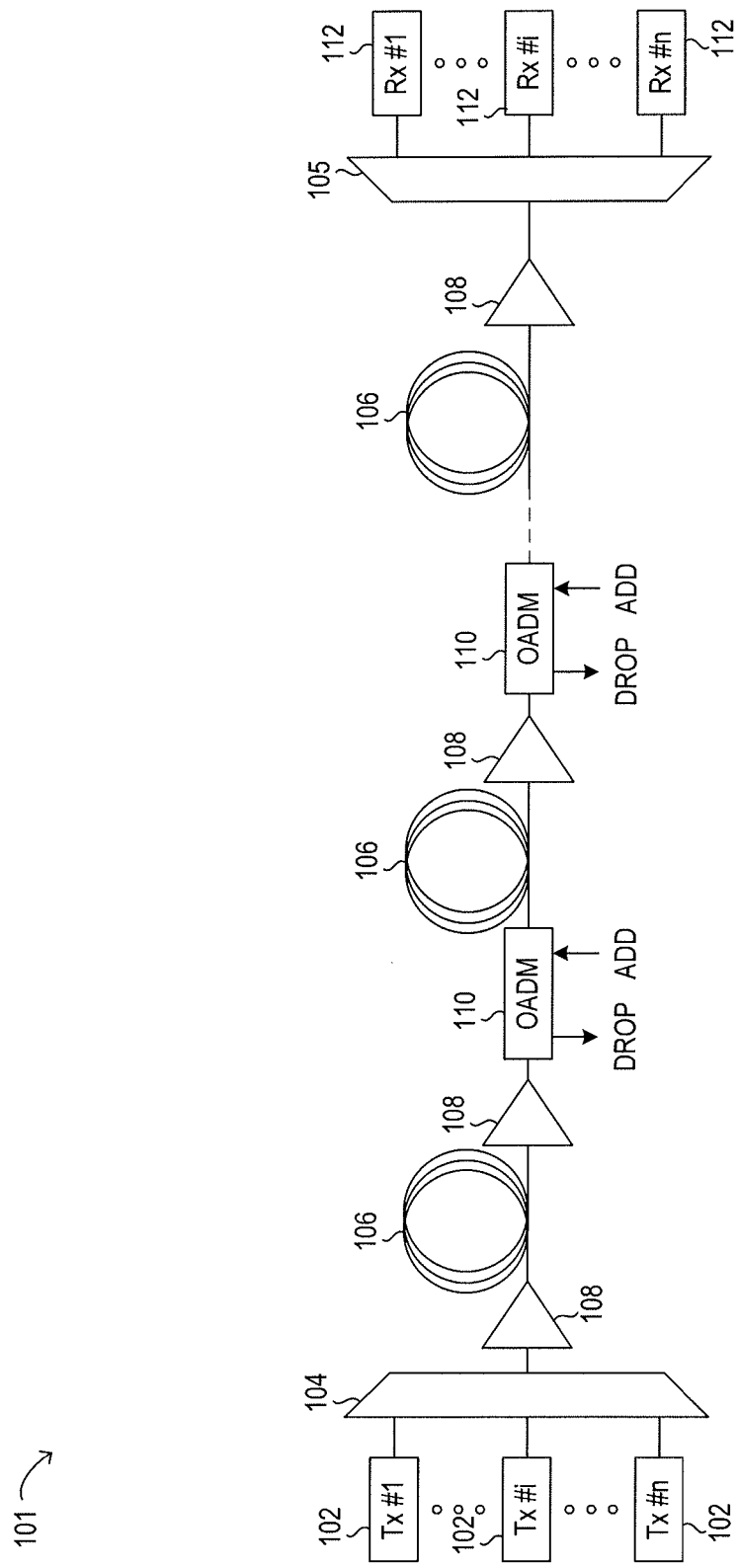
FIG. 1 is a block diagram of selected elements of an embodiment of an optical network, according to at least one embodiment.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information included in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) included in the optical signals. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), pulse-amplitude modulation (PAM), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may provide achievement of a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may include a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information may be transmitted over an optical network is the bit rate of transmission. The higher the bit rate, the greater the transmitted information capacity. Achieving higher bit rates may be limited by the availability of wide bandwidth electrical driver technology, digital signal processor technology and increases in the required OSNR for transmission over optical network 101.

As noted above, an optical network (such as Optical network 101) may include one or more optical transmitters to transmit optical signals through the optical network in specific wavelengths or channels. In some embodiments, these transmitters may include optical transponders, each of which may include a laser and a modulator to receive electrical and/or optical signals. The optical transponders may modulate the information included in the signals they receive onto a beam of light produced by the laser at a particular wavelength, and may transmit the beam for carrying the signal throughout the optical network. In some embodiments, the optical transponders may also perform signal regeneration. In some embodiments, the optical transponders may interface with a host system over a parallel interface. In some embodiments, the optical transponders may convert full-duplex electrical signals that they receive to full-duplex optical signals. In other embodiments, the optical transponders may convert an optical signal at one wavelength to an optical signal at another wavelength. Each such wavelength-converting transponder may receive an optical data signal (e.g., as client traffic) and may convert it first into the electrical domain and then into an optical data signal at a different wavelength for transmission over the optical network. For example, the transponder may convert the signal into a signal at a wavelength that is supported in a specific system for transmission over a specific optical network, according to the optical modulation scheme(s) implemented in the system. In some embodiments, the wavelength-converted optical data signals generated by each of multiple transponders may be combined together into a multi-wavelength optical signal using an optical multiplexer.

The relative phases of the in-phase and quadrature (I/Q) components in optical coherent modulation formats may be referred to as "in-phase/quadrature skew", "I/Q skew", or simply "skew". The in-phase/quadrature skew of the signals transmitted by an optical coherent transponder is one of the parameters that determines the performance and quality of the transponder. Therefore, during design and/or production of an optical coherent transponder, measurements of the combined electrical and optical skew may be made to ensure that the transponder is operating within acceptable skew limits. If not, modifications may be made to the transponder in an attempt to reduce (or minimize) the amount of I/Q skew in the optical signals transmitted by the transponder. Similarly, bias errors in an outer MZ modulator can negatively affect the performance of the transponder. For example, for optimum performance of the optical coherent transponder, the two I and Q components of the optical signals transmitted by the transponder should be perfectly orthogonal.

Existing skew measurement methods are not very accurate for complex modulation formats, and the equipment needed to perform the measurements can be very expensive. Attempts to modify the transponder to compensate for the I/Q skew or to correct for bias errors in an outer MZ modulator using skew compensation techniques that are based on these existing measurement techniques do not always succeed. In addition, the accuracy and performance of existing skew measurement techniques (and skew compensation techniques or bias error correction techniques based on these skew measurement techniques) can be affected by background noise, jitter, power instability (such as amplitude instability), and/or pulse shape.

In some embodiments of the present disclosure, a system and method for detecting and correcting bias errors may employ a method for measuring I/Q skew that provides more accurate skew measurements using less expensive equipment than existing skew measurement methods. Unlike with some existing skew measurement techniques, in some embodiments, these methods may not require the measurement of the total skew in an optical coherent transponder (which may include an electrical skew component, an optical skew component, and the amount of skew introduced by a de-skewing filter in the transponder) in order to detect and correct bias errors in an outer MZ modulator of the transponder. In addition, unlike with some existing skew measurement techniques, the techniques described herein for detecting and correcting bias errors in an outer MZ modulator may be unaffected by background noise, jitter, power instability (such as amplitude instability), and/or pulse shape.

During production of an optical coherent transponder, the manufacturer may wish to eliminate the initial I/Q skew (or total skew) of the transponder due to its design, or at least to reduce the I/Q skew (or total skew) to a level such that any residual skew in individual transponders can be compensated for without having to replace any of the underlying hardware components of the transponder. In some cases, a transponder may include a de-skewing filter that introduces some amount of skew into the signals that are transmitted by the transponder. In some cases, this de-skewing filter can be used to add additional skew or to subtract some amount of skew in order to compensate for the I/Q skew. However, if the initial skew is more than a one-half symbol delay (according to the modulation format), the direction of compensation can be unclear. This is sometimes referred to as the "one symbol uncertainty" problem. Therefore, in manufacturing, it may desirable that the transponder not have an I/Q skew that requires a skew compensation of more than a one-half symbol delay. In at least some embodiments of the present disclosure, optical filters and an optical power meter connected to a transponder may be used to determine the value of a de-skewing filter needed to compensate for the initial skew of the transponder, rather than more expensive equipment, such as an Optical Modulation Analyzer (OMA). In such embodiments, by analyzing the power of the first harmonics of simulated sinusoids and minimizing the power of those harmonics (and assuming that a de-skewing filter with enough range is present in the transponder), the skew in an optical coherent transmitter may be reduced (or minimized) without needing to measure the skew itself. As described in more detail below, by analyzing the power of the first harmonics of simulated sinusoids and minimizing the power of those harmonics, bias errors in an outer MZ modulator may be detected and/or corrected.

Figure 2:
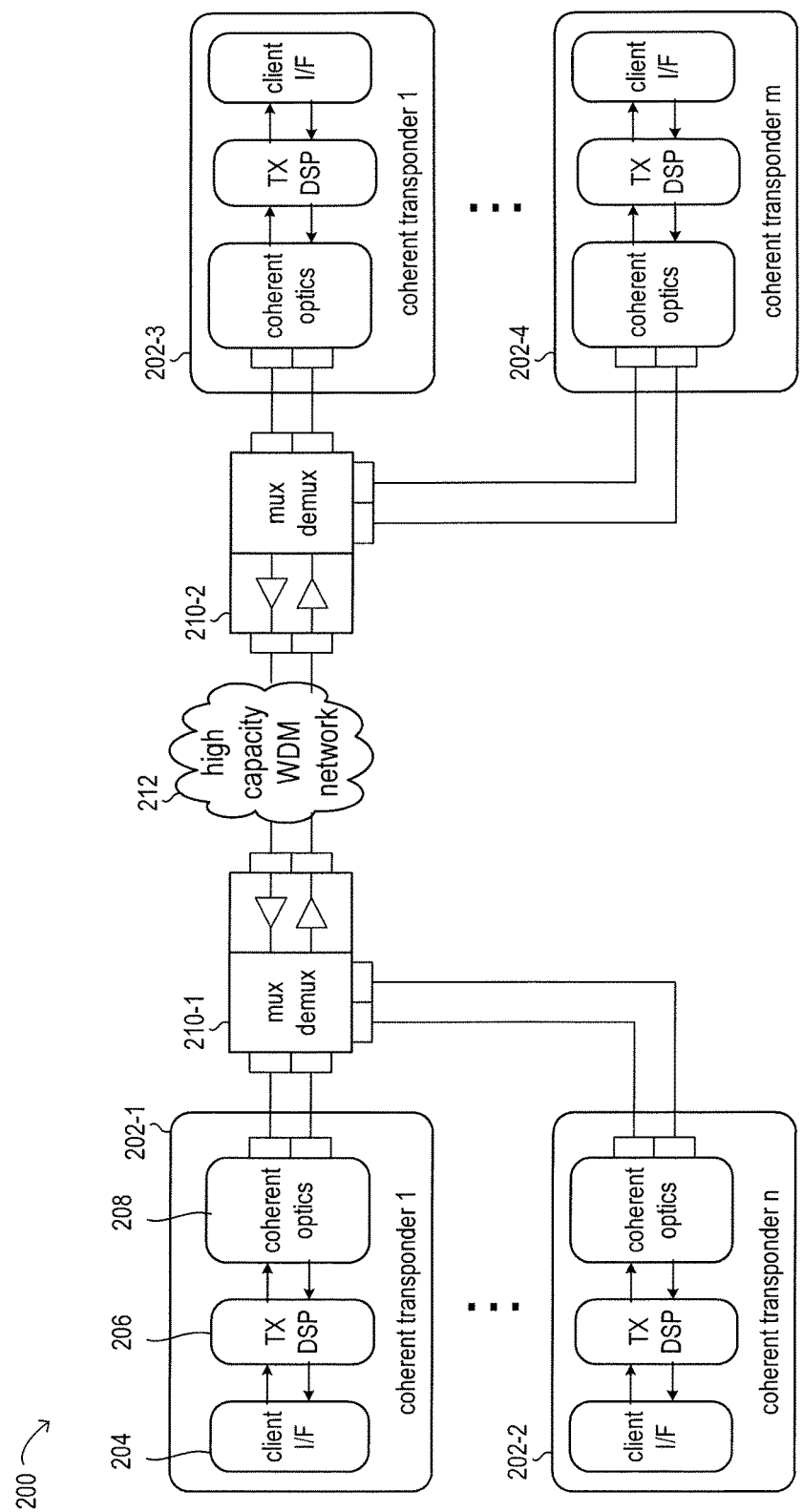
FIG. 2 is a block diagram of selected elements of a wavelength division multiplexing (WDM) system, according to at least some embodiments.

In some embodiments, an optical network (such as Optical network 101) may be implemented as a wavelength division multiplexing (WDM) system. In some such embodiments, the transmitters may include optical coherent transponders. In general, an optical coherent transponder is an optical transponder in which a fixed relation between the frequency and phase of the input and output signals is maintained or in which transmitted and received signals are in phase. FIG. 2 is a block diagram of selected elements of a WDM system 200, according to at least some embodiments. In this example embodiment, WDM system 200 includes multiple optical coherent transponders (shown as coherent transponders 202), including multiple optical coherent transponders 202 (labeled as coherent transponders 1-n and coherent transponders 1-m, respectively) on each side of a high capacity WDM network 212. In this example embodiment, each of these coherent transponders 202 may implement the functionality of an optical transmitter, such as one of the optical transmitters 102 illustrated in FIG. 1.

Figure 3:
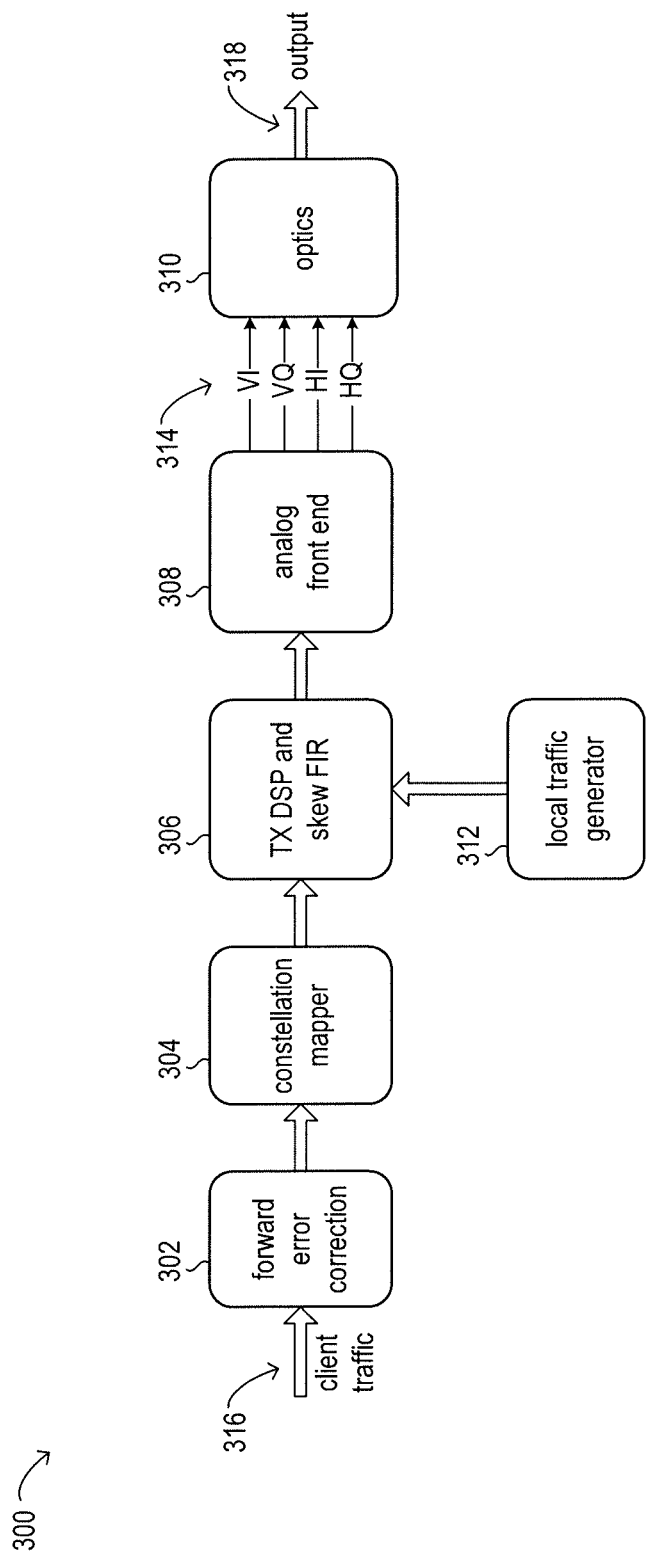
FIG. 3 is a block diagram of selected elements of a system for implementing an optical coherent transponder, according to at least some embodiments.

In this example embodiment, coherent transponder 202-1 includes a client interface 204 through which client traffic may be received (not shown). Coherent transponder 202-1 also includes a transmitter/DSP element 206, which may perform a variety of functions, including frequency equalization and pulse shaping. Coherent transponder 202-1 also includes a coherent optics element 208, which may include a laser, a splitter, and one or more modulators, in various embodiments. As illustrated this example embodiment, each of a plurality of other optical coherent transponders 202 (including coherent transponders 202-2, 202-3, and 202-4) may include substantially the same elements as those included in coherent transponder 202-1. A more detailed example of an optical coherent transponder and its components is illustrated in FIG. 3 and described below.

In this example embodiment, system 200 includes a multiplexer/demultiplexer (shown as a mux/demux element 210) on each side of the WDM network 212. In this example embodiment, each of these mux/demux elements 210 may implement the functionality of an optical multiplexer (such as multiplexer 104 illustrated in FIG. 1) and the functionality of an optical demultiplexer (such as demultiplexer 105 illustrated in FIG. 1). For example, mux/demux element 210-1 may be a system, apparatus or device to combine the signals transmitted by coherent transponders 202-1 and 202-2 (and any other coherent transponders 202 on the same side of WDM network 212) at respective individual wavelengths, into a WDM signal for transmission over WDM network 212.

A high-speed optical transmitter (such as one of the transmitters 102 illustrated in FIG. 1) may, in some embodiments, include an optical coherent transponder (such as one of the coherent transponders 202 illustrated in FIG. 2). FIG. 3 is a block diagram of selected elements of a system 300 for implementing an optical coherent transponder, according to at least some embodiments. In various embodiments, the coherent transponders 202 illustrated in FIG. 2 may include some or all of the elements of the optical coherent transponder system 300 illustrated in FIG. 3. In this example embodiment, optical coherent transponder system 300 may receive (as input) client traffic 316 and may produce an optical signal (shown as output 318) for transmission over an optical network. In some embodiments, the output signal 318 may be produced in an optical modulation format that is suitable for transmission in a wavelength division multiplexing system, such as WDM system 200 illustrated in FIG. 2.

In this example embodiment, the client traffic 316 coming into the transponder may include multiple digital or analog electrical signals containing information to be encoded onto an optical signal for transmission through phase and/or amplitude modulation, depending on the format. In some embodiments, the input may be a digital signal including a return-to-zero (RZ) or a non-return-to-zero (NRZ) encoding. These are encodings in which a value of "one" is represented by one significant condition (such as a positive voltage or a DC bias on the transmission line) while a value of "zero" is represented by some other significant condition (such as a negative voltage or the absence of bias), with or without an additional neutral or rest condition, respectively. In such embodiments, the client traffic 316 presented to the forward error correction element 302 and the constellation mapper 304 may be digital, but it may be converted to an analog signal to be modulated for transmission by subsequent elements within system 300.

In the example embodiment illustrated in FIG. 3, the forward error correction element 302 may include circuitry to correct transmission errors by adding redundancy to the messages it receives in the client traffic 316. The constellation mapper 304 may include circuitry to map a combination of bits at its input into multiple data signals that correspond to a specific symbol within the set of symbols that can be transmitted using a specific modulation format. In some embodiments, the constellation mapper may transform multiple input lines that carry on/off modulating signals (e.g., NRZ bits) into one complex multilevel modulation format (e.g., 16-QAM symbols) to be transmitted over two channels. For example, the constellation mapper may receive, in parallel, four bits for the H signal and four bits for the V signal. The constellation mapper may combine the four bits for the H signal into one symbol of the multilevel modulation format, and generate the corresponding HI and HQ signals. Similarly, the constellation mapper may combine the four bits for the V signal into one symbol of the multilevel modulation format, and generate the corresponding VI and VQ signals. The output of the constellation mapper may include the four signals HI, HQ, VI, and VQ.

In the example embodiment illustrated in FIG. 3, system 300 includes an alternate source of input for the signal to be modulated and transmitted by the optical coherent transponder, shown as local traffic generator 312. In some embodiments, local traffic generator 312 may include circuitry to generate input traffic (locally) representing a particular pattern. In other embodiments, local traffic generator 312 may be programmable to generate input traffic (locally) representing a specified pattern. For example, in a test mode or calibration mode, local traffic generator 312 may generate four signals, each representing a series that includes alternating values of zeros and ones (e.g., 01010101 . . . ), the four signals corresponding to HI, HQ, VI, and VQ. As in the client traffic case, the remaining elements of system 300 may transform these locally-generated signals for transmission over two channels. In at least some embodiments of the present disclosure, a de-skewing operation and/or a bias error correction operation may be performed while in a test mode, and may include generating these types of signals.

In the example embodiment illustrated in FIG. 3, system 300 includes an element 306 comprising circuitry to perform the functions of a transmitter/DSP and a finite impulse response filter (more specifically, a skew FIR filter). In this example, element 306 may perform a variety of functions within the optical coherent transponder system 300, including, but not limited to, frequency equalization, pulse shaping, and/or deliberately introducing delays (skew) for each of the four signals HI, HQ, VI, and VQ independently. In this example, element 306 may receive the output of the constellation mapper 304 in order to transform client traffic 316 for transmission (e.g., during normal operation) or may receive the output of local traffic generator 312 (e.g., when operating in a test mode or calibration mode). The skew FIR shown within element 306 may be an electrical FIR including circuitry to introduce an additional amount of skew in the transponder. For example, in some embodiments, the skew FIR may be configurable or programmable to perform fine-tuning of the residual skew generated by the optical coherent transponder or to de-skew its output. In some embodiments, the amount of skew introduced by this filter (which may sometimes be referred to herein as a "de-skewing FIR filter", or simply a "de-skewing filter") may be modified to compensate for the initial skew in an optical coherent transponder.

In the example embodiment illustrated in FIG. 3, an analog driver 308 may include circuitry to adjust the four signals HI, HQ, VI, and VQ to drive electro-optical components within optics 310 (e.g., Mach-Zehnder modulators). More specifically, analog driver 308 may perform the functionality of an amplifier that boosts the four signals HI, HQ, VI, and VQ to generate amplified signals, and may adapt the impedances between the amplified signals and such modulators. The output of analog driver 308, shown collectively in FIG. 3 as signals 314, may be analog signals having the voltages required by modulators within optics element 310 to generate a modulated optical signal, shown as output 318.

In various embodiments, optics element 310 may include one or more lasers, splitters, modulators, and/or other circuit elements (not shown). In some embodiments, the output 318 of optics element 310 may be a signal that is a combination (sum) of the H and V polarizations generated by modulating the four signals HI, HQ, VI, and VQ produced by the preceding elements of optical coherent transponder system 300, and each polarization may be a 16-QAM signal. In such embodiments, one 16-QAM signal may be modulated to carry the information from the HI and HQ signals, while the other 16-QAM signal may be modulated to carry the information from the from the VI and VQ signals. In some embodiments, the H and V polarizations may be generated in substantially the same manner, except that the V polarization may then be rotated by 90 degrees. In some embodiments of the present disclosure, the skew compensation techniques described herein may be applied to reduce the I/Q skew for one channel (polarization) at a time. In such embodiments, the channel (polarization) that is not the target of the skew compensation operation may be disabled or turned off during the skew compensation operation.

All of the components of system 300 illustrated in FIG. 3 may be considered part of the transponder (on the transmission side), at least in some embodiments. In other embodiments, the functionality of these components may be divided up differently among the components of an optical network or within an optical coherent transponder.

As noted above, some existing methods for measuring in-phase/quadrature skew rely on the use of an Optical Modulation Analyzer (OMA) to take the measurements. These instruments, though very expensive, have limited accuracy when measuring the skew for optical signals in advanced (complex) modulation formats. For example, the measurement resolution for an OMA is typically on the order of ±1 ps. Thus, any adjustment of the skew that is less than 1 ps is not likely be detected by the OMA. However, for certain classes of optical coherent transponders, the maximum acceptable combined transmission (TX) and reception (RX) skew over their usable life is on the order of 3 ps, and the transponder may not be error-free outside of this range. In general, any skew error may result in a transmission penalty that reduces the maximum error-free distance supported by the transponder, and the larger the skew error, the larger the penalty would be. Rather than relying on skew measurements made by an OMA, the systems described herein may perform de-skewing and/or bias error correction operations using less expensive equipment and without having to measure the actual skew in an optical coherent transponder under test. In coherent transponders that employ a dual-polarization format (such as a format that includes a horizontal polarization H and a vertical polarization V), the methods described herein may be used to correct bias errors in an outer MZ modulators in the paths for either one of the two polarizations. As described in more detail herein, these methods may be used to find the optimal bias voltage for an outer MZ modulator (the bias voltage amount that results in the best performance). As noted above, these methods may not be affected by background noise, jitter, power instability (such as amplitude instability), or pulse shape. In at least some embodiments, the skew error correction techniques described herein may not suffer from "one symbol uncertainty", but may be robust against two symbols. The systems and methods described herein for performing bias error correction may be dependent on an analysis of the optical power of first harmonics of a simulated sinusoidal wave (or a combination of sinusoidal signals) transmitted by the transponder and determining the optimal bias voltage for an outer MZ modulator based on the measured optical power of the first harmonics.

Figure 4:
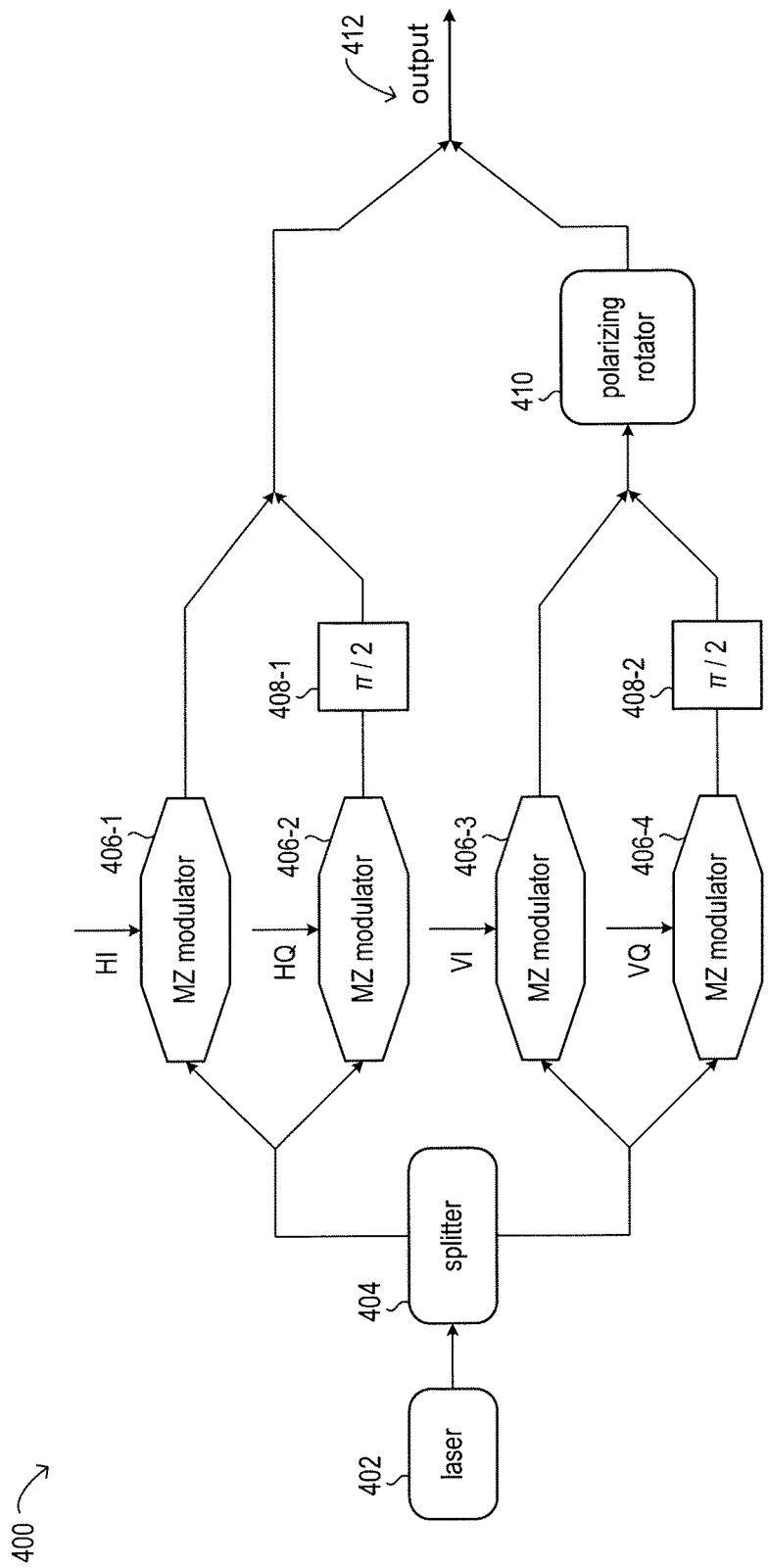
FIG. 4 is a block diagram of selected elements of an optics component of an optical coherent transponder, according to at least some embodiments.

FIG. 4 is a block diagram of selected elements of an optics component 400 of an optical coherent transponder, according to at least some embodiments. In some embodiments, optics component 310 illustrated in FIG. 3 may be substantially similar to optics component 400. In this example embodiment, optics component 400 includes a laser 402, a splitter 404, four Mach-Zehnder (MZ) modulators 406 (shown as MZ modulators 406-1, 406-2, 406-3, and 406-4), two "outer" MZ modulators 408 (shown as elements 408-1 and 408-2), and a polarizing rotator 410. In this example embodiment, inputs to optics component 400 include the signals HI, HQ, VI, VQ, which may be similar to the signals shown collectively as signals 314 (the outputs of analog front end 308) in the system illustrated in FIG. 3. These signals may be analog signals having the voltages required by the MZ modulators 406 and 408 within optics element 400 to generate a modulated optical signal, shown as output 412.

In this example embodiment, the splitter 404 splits the optical signal (light) generated by laser 402 into two identical parts. In this example embodiment, each of the MZ modulators 406 may include circuitry to modulate the phase and amplitude of the optical signal generated by laser 402 (after it is split), according to its respective input. Each of the "outer" MZ modulators 408 may include circuitry to introduce a phase shift of $\pi/2$ radians. For example, when these modulators are properly biased, they may provide a constant $\pi/2$ phase shift between the I and Q components of the H or V polarization. More specifically, each of the outer" MZ modulators 408 may perform a $\pi/2$ phase shift on one of the two optical components of the signal, to achieve the I/Q orthogonality.

In this example embodiment, the optical coherent transponder implements a dual polarization scheme, which transmits two channels. One channel is transmitted on one polarization of the light (corresponding to the HI and HQ components of the signal) and another channel is transmitted on the other polarization of the light (corresponding to the VI and VQ components of the signal). In this example, the polarization rotator 410 rotates the polarization of the second channel to make it orthogonal to the polarization of the first channel. In this way the two channels (polarizations) do not interfere with each other.

As described above, the orthogonality of the in-phase and quadrature (I/Q) components of an optical signal transmitted by an optical coherent transponder may affect the optical performance of the optical network. Some existing approaches to investigating bias errors in the outer MZ modulators of optical coherent transponders rely on analyzing the constellation of the optical signal using an Optical Modulation Analyzer (OMA). With these approaches, the effects of bias errors in the outer MZ modulators are usually observed as constellation distortions on the OMA. With these approaches, the accuracy of the bias error measurement is affected by the quality of the optical coherent receiver and by the quality of the DSP used to re-create the constellation. In at least some embodiments of the present disclosure, the systems and methods described herein may be used to find the optimal bias voltage of the outer Mach-Zehnder modulator using less expensive equipment, such as a simple optical power meter and one or more optical filters, to analyze the optical spectrum. The methods described herein for detecting and correcting bias errors in the outer Mach-Zehnder modulators of optical coherent transponders may be more accurate than other methods. Unlike some existing bias error measurement techniques, these methods may not be dependent on a coherent receiver and DSP to retrieve the constellation, and they may be unaffected by optical noise and distortions, jitter, power instability (such as amplitude fluctuation), and/or pulse shape.

To demonstrate the relationship of the skew between the electrical path of a specific optical coherent transponder and the optical path of the transponder for a given optical signal and the corresponding optical power of the first harmonics of the signal, a local traffic generator of the transponder may be set to generate an input signal representing a series that includes alternating values of zeros and ones (e.g., 01010101, and so on) on both the in-phase and quadrature components of one of the channels (polarizations). In this example, the transponder would be set to generate these signals in phase. This input pattern represents a modulating electrical signal that is essentially a sinusoid, with most of the spectral content generated in the first harmonic. Therefore, the optical signal of each of the components I and Q, is phase-modulated by sinusoid. In this specific transponder, the symbol time is on the order of 32 ps. Therefore, the first harmonic is expected to be at about ±16 GHz from the carrier. In this example, the optical power of the first harmonic of the output is measured on both the positive and negative side of the spectrum (with respect to the carrier frequency) by an Optical Spectrum Analyzer (OSA). Measurements have shown that, under this condition, a small variation in the skew causes a significant change in the power of the first harmonic. Measurements have also shown that, relative to the carrier, the effect of the skew on the power of the first harmonic on the lower frequency side and on the higher frequency side have opposite behavior.

In at least some embodiments of the present disclosure, by measuring the optical power of the first harmonics of an optical signal in a complex modulation format that is transmitted by an optical coherent transponder while varying the amount of skew introduced by a de-skewing filter in the transponder, the optimal bias voltage of the outer Mach-Zehnder modulator may be identified without the need to measure the skew itself. In some embodiments, the optical power measurements may be taken using a system (e.g., a test system) that includes an OSA. In other embodiments, the optical power measurements may be taken using a system (e.g., a test system) that includes one or more optical filters and an optical power meter. As described above, in at least some embodiments, the bias error correction methods described herein may be more accurate and less expensive to perform than existing bias error correction methods. These bias error correction methods may not be dependent on calibration data.

In at least some embodiments, a bias error correction operation for a given optical coherent transponder may include configuring a local traffic generator of the transponder to generate an input signal representing a series that includes alternating values of zeros and ones (e.g., 01010101, and so on) in each of the I and Q components on both the in-phase and quadrature components of one of the channels (polarizations), with the transponder set to generate these signals in phase. As noted above, this input pattern represents a modulating electrical signal that is essentially a sinusoid, with most of the spectral content generated in the first harmonic. The bias error correction operation may be robust against two symbols and, unless the initial skew is greater than a one symbol delay, the skew itself need not be measured. In at least some embodiments, the bias error correction operation may include repeatedly changing the amount of skew introduced by the de-skewing filter by a fixed increment and measuring the optical power of the first harmonics (($f_c-f_0$) and ($f_c+f_0$)) of the resulting output signal for each different amount of skew. In some embodiments, one or more passive optical filters may be used to isolate the positive and negative first harmonics of the output signal transmitted by the transponder, and the filtered output may be input to an optical power meter.

Figure 5:
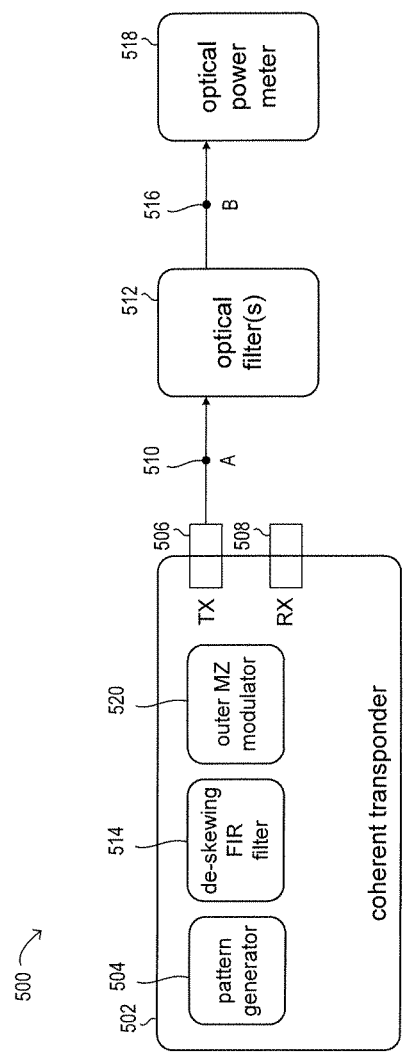
FIG. 5 is a block diagram of selected elements of a system for detecting and correcting bias errors in an optical coherent transponder, according to at least some embodiments.

In some embodiments, the amount by which the amount of skew introduced by the de-skewing filter is changed may be dependent on the resolution with which the amount of skew can be changed. For example, the amount by which the amount of skew introduced by the de-skewing filter is changed may be the smallest amount by which the skew can be changed. In some embodiments, the method may include scanning the entire range of values for the amount of skew that can be introduced (through addition or subtraction) by the de-skewing filter. In some embodiments, the method may include scanning a range of values for the amount of skew that can be introduced by the de-skewing filter that corresponds to a two-symbol delay. As illustrated in FIG. 5 and described below, in least some embodiments, a bias error correction operation may include analyzing the resulting power measurements to detect and/or measure a bias error in the outer MZ modulator, and to calculate an optical bias voltage for the outer MZ modulator that corrects the corresponding phase shift in the optical signal.

FIG. 5 is a block diagram of selected elements of a system 500 for detecting and correcting bias errors in an optical coherent transponder, according to at least some embodiments. In at least some embodiments, system 500 may be used to correct a bias error in an "outer" Mach-Zehnder (MZ) modulator of a coherent transponder. In the example embodiment illustrated in FIG. 5, system 500 includes an optical power meter 518, one or more passive optical filters 512, and a coherent transponder under test (shown as coherent transponder 502). In this example, coherent transponder 502 includes a pattern generator 504, de-skewing FIR filter 514, an outer MZ modulator 520, a transmitter 506, and a receiver 508. In at least some embodiments, system 500 may be used to determine the optimal bias voltage for the outer MZ modulator 520 to compensate for a detected bias error in coherent transponder 502.

In this example embodiment, coherent transponder 502 may produce an optical signal in response to a digital signal generated (locally) by pattern generator 504. In some embodiments, the pattern generator 504 of coherent transponder 502 may be set to generate a signal representing a series that includes alternating values of zeros and ones on both the I and Q components, where all patterns are in phase. In other embodiments, other input patterns may be used. In this example, de-skewing FIR filter 514 may introduce some amount of skew into the optical signal that was generated by coherent transponder 502 in response to the locally generated input, and the output of de-skewing FIR filter 514 may be modulated by an optics component (such as optics component 400 illustrated in FIG. 4) before being provided to transmitter 506. Outer MZ modulator 520 may be an element of this optics component. In this example, the output of transmitter 506, as seen at point A (510), is provided to one or more passive optical filters 512. Optical filters 512 may isolate the positive and/or negative first harmonics of the output of transmitter 506. In this example, the output of optical filters 512, as seen at point B (516) may be provided to optical power meter 518, which may be used to measure the optical power of the first harmonic(s) of the output of transmitter 506.

In order to determine the optimal bias voltage for the outer MZ modulator 520, respective measurements of the optical power of the first harmonic(s) of the output of transmitter 506 may be taken while the amount of skew introduced by de-skewing FIR filter 514 is changed. For example, a configurable parameter or component of de-skewing FIR filter 514 may be modified repeatedly to increment and/or decrement the amount of skew introduced by de-skewing FIR filter 514 by a small fixed amount. The amount of skew introduced by de-skewing FIR filter 514 may be incremented and/or decremented (and corresponding power measurements may be taken) enough times to include all possible skew amounts in a range that is two symbols wide. In at least some embodiments, optical power meter 518 may include logic and/or circuitry to store the power measurements taken for each different skew amount for subsequent analysis. In at least some embodiments, the optimal bias voltage for the outer MZ modulator 520 may be determined based, in part, on these power measurements. For example, the power measurements may be analyzed to identify the minimum optical power value that was obtained from the measurements of the optical power of the positive first harmonics and the minimum optical power value that was obtained from the measurements of the optical power of the negative first harmonics, and the amount of skew that was introduced by the de-skewing filter when these minimum optical power values were obtained may be determined.

In at least some embodiments of the present disclosure, a bias error in the optical coherent transponder may be detected if a curve representing the measurements of the optical power of the positive first harmonics (with respect to the skew amounts introduced by de-skewing FIR filter 514) and a curve representing the measurements of the optical power of the negative first harmonics (with respect to the skew amounts introduced by de-skewing FIR filter 514) are not (or would not be) orthogonal. In some embodiments, detecting that such curves are not (or would not be) orthogonal may include measuring the difference between the skew amounts that were introduced by de-skewing FIR filter 514 when the minimum optical power value was obtained from the measurements of the optical power of the positive first harmonics and when the minimum optical power value was obtained from the measurements of the optical power of the negative first harmonics. For example, if the difference between the two skew amounts is a value other than one representing two symbols (according to the optical modulation format), this may be indicative of a bias error in the outer MZ modulator 520 of the optical coherent transponder 500. In some embodiments, the bias error may be corrected by adjusting the bias voltage of the outer MZ modulator 520 so that the difference between two skew amounts corresponding to the minimum optical power measurements for the positive and negative first harmonics represents one symbol. In this case, a curve representing the measurements of the optical power of the positive first harmonics (with respect to the skew amounts introduced by de-skewing FIR filter 514) and a curve representing the measurements of the optical power of the negative first harmonics (with respect to the skew amounts introduced by de-skewing FIR filter 514) are not orthogonal would be orthogonal.

In some embodiments, system 500 may include logic and/or circuitry to detect and/or measure a bias error in the outer MZ modulator 520, or to determine (e.g., automatically) the optimal bias voltage for the outer MZ modulator 520, based on the measurements of the optical power of the first harmonics of the signal transmitted by transmitter 506, and on the corresponding amounts of skew introduced by de-skewing FIR filter 514 when the measurements were taken. In some embodiments, this bias error correction logic/circuitry may be included in optical power meter 518

(not shown). In other embodiments, this bias error correction logic/circuitry may be included, along with optical power meter 518 and one or more optical filters 512, in a test system that is used to detect and/or correct such a bias error in optical coherent transponders during design, during manufacturing, and/or during production use to ensure that the optical coherent transponders operate within acceptable limits.

In some embodiments, the bias error correction logic/circuitry may include one or more programmable elements for which various parameters may be changed through the execution of test software or production software. For example, in some embodiments, a test system may implement an application programming interface that allows a user to specify a pattern to be generated by pattern generator 504, to select pattern generator 504 (as opposed to client traffic) as the source of the signal to be modulated and transmitted by transponder 502, to specify a parameter of de-skewing FIR filter 514 within transponder 502 that controls the amount of skew that is deliberately and explicitly introduced by de-skewing FIR filter 514 in order to de-skew the signal transmitted by transponder 502, and/or to specify a parameter of outer MZ modulator 520 that controls the bias voltage of the modulator. In such embodiments, program instructions may be executed by a processor in the test system (or in a computer that drives the test system) to cause the programmable elements to be configured in particular ways while in a test mode and/or while in a production mode or in normal operation. For example, in some embodiments, the test system (which may be a test bench or piece of test equipment) may include (in addition to an optical power meter, one or more optical filters, and/or bias error correction logic/circuitry) a command interface and a display (for displaying optical power measurements and corresponding skew amounts, an indication or measurement of a bias error, or an optimal bias voltage for the outer MZ modulator). The test system may be communicatively coupled to a processor or computer that provides commands to the optical power meter and/or to bias error correction logic/circuitry and receives output (e.g., optical power measurements, skew values, indications or measurements of bias errors, or optimal bias voltage values) from the optical power meter and/or bias error correction logic/circuitry, respectively. In some embodiments, program instructions may be executed by the processor or computer to analyze the power measurement values, to identify the minimum power values obtained for the positive and negative first harmonics, to determine the amount of skew that was introduced by the de-skewing filter when the minimum power values were obtained, to detect a bias error in the transponder under test, and/or to determine the optimal bias voltage for the corresponding outer MZ modulator. In some embodiments, program instructions may be executed by the processor or computer to cause the bias voltage for the outer MZ modulator to be set to the determined optimal amount and/or to return or display the optimal bias voltage.

In some cases, even if the bias voltage in an outer MZ modulator of an optical coherent transponder is perfectly set to its nominal value, as designed, imperfections in an individual modulator may result in a bias error that can be corrected by adjusting the bias voltage to apply an offset from the nominal value. The amount of the bias error, which may be slightly different for respective individual modulators, and the corresponding bias offset to correct it, may only be captured in the optical domain. However, existing methods for determining the bias error are typically based on observations of constellation distortions made with an OMA and may not be as accurate as those that can be obtained using the bias error correction techniques described herein. In at least some embodiments, the bias error correction techniques described herein may be based on a mathematical model that has been developed to demonstrate that, under the test conditions described herein, if the I/Q components are not orthogonal (e.g., if the transponder includes a non-optimal bias voltage of the outer MZ modulator), the behavior of the first harmonic on the lower frequency side ($f_c-f_0$) and the behavior of the first harmonic on the higher frequency side ($f_c+f_0$) of the carrier frequency ($f_c$) became different. This different behavior results from the fact that, under these conditions, the electrical phase shift and the optical phase shift change the optical spectrum differently. More specifically, as the I/Q components move away from orthogonality (in response to a decreasing bias voltage on the outer MZ modulator), curves representing the optical power of the positive and negative first harmonics may be shifted by the same amount, but in opposite directions. For example, the skew value at the point at which the minimum power of the first harmonic on the higher frequency side is taken may shift toward the higher skew value at the point at which the minimum power of the first harmonic on the lower frequency side is taken. Similarly, the skew value at the point at which the minimum power of the first harmonic on the lower frequency side is taken may shift toward the lower skew value at the point at which the minimum power of the first harmonic on the higher frequency side is taken. If the I and Q components are parallel, the curves representing the optical power of the positive and negative first harmonics may overlap perfectly. In at least some embodiments, and according to a mathematical model that takes these conditions into account (and as demonstrated by experimental results), the bias inaccuracy of the outer MZ modulator may be measured with a resolution equal to $\pi/2$ divided by the number of skew steps needed to achieve a one-half symbol shift.

Figure 6A:
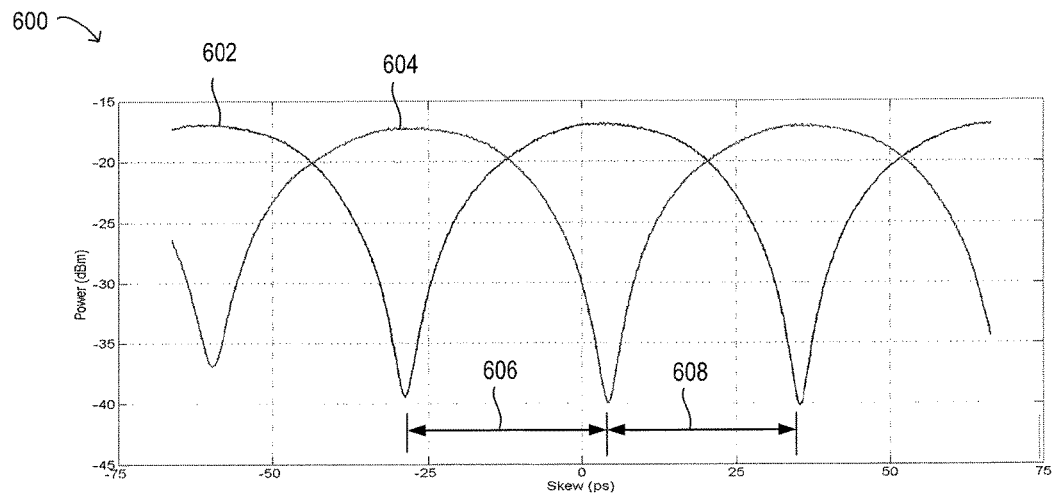
FIGS. 6A and 6B illustrate examples of the phase relationship between the measured optical power of the first harmonics of an optical signal transmitted by an optical coherent transponder and bias errors in the transponder, according to at least some embodiments.
Figure 6B:
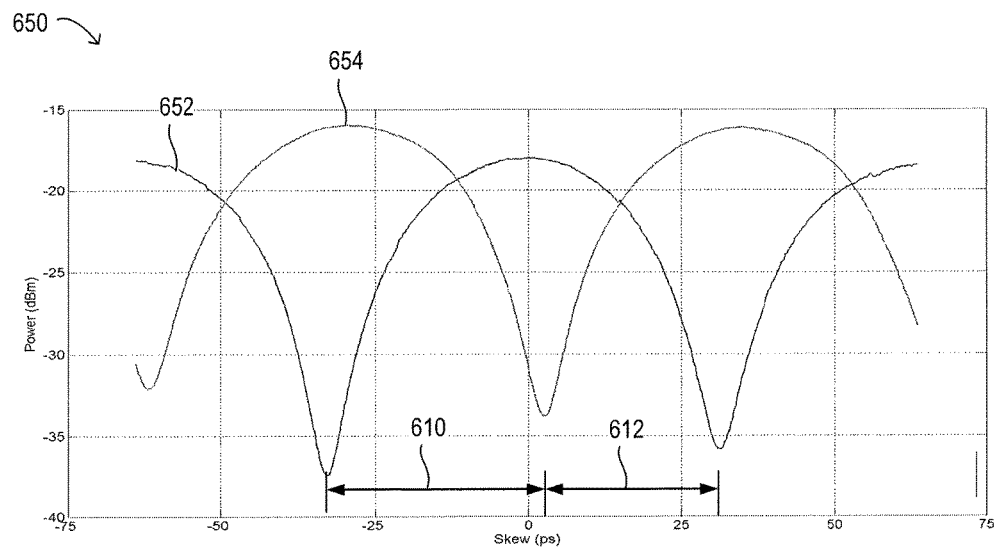

FIGS. 6A and 6B illustrate the phase relationship between the measured optical power of the first harmonics of an optical signal transmitted by an optical coherent transponder and bias errors in the transponder, according to at least some embodiments. More specifically, FIG. 6A illustrates optical power measurements taken in the presence of different amounts of skew when the outer Mach-Zehnder (MZ) modulator of the transponder is optimally biased, and FIG. 6B illustrates optical power measurements taken in the presence of different amounts of skew when the outer MZ modulator of the transponder is not optimally biased (that is, when there is a bias error). In this example, the symbol time for the transponder under test is 32 ps.

Graph 600 in FIG. 6A represents the relationship between the measured optical power of the first harmonics of an optical signal and the amount of additional skew that is introduced by a de-skewing FIR filter. More specifically, each of the two curves in graph 600 illustrates the optical power of one of the first harmonics (measured in decibels referenced to one milliwatt) over a range of skew values (in ps), each representing an amount of skew introduced by the de-skewing FIR filter for a respective one of the power measurements. In this example, each point on curve 604 maps the optical power of the positive first harmonic ($f_c-f_0$) to a corresponding amount of skew introduced by the de-skewing FIR filter. Similarly, each point on curve 602 maps the optical power of the negative first harmonic ($f_c+f_0$) to a corresponding amount of skew introduced by the de-skewing FIR filter. In this example, since the outer MZ modulator is optimally biased, the distance between the points of minimum power on the two curves (the difference between the corresponding skew amounts, shown as 606 and 608) is exactly one symbol (32 ps).

Graph 650 in FIG. 6B also represents the relationship between the measured optical power of the first harmonics of an optical signal and the amount of additional skew that is introduced by a de-skewing FIR filter. Here again, each of the two curves in graph 650 illustrates the optical power of one of the first harmonics (measured in decibels referenced to one milliwatt) over a range of skew values (in ps), each representing an amount of skew introduced by the de-skewing FIR filter for a respective one of the power measurements. In this example, each point on curve 654 maps the optical power of the positive first harmonic $(f_c-f_0)$ to a corresponding amount of skew introduced by the de-skewing FIR filter. Similarly, each point on curve 652 maps the optical power of the negative first harmonic $(f_c+f_0)$ to a corresponding amount of skew introduced by the de-skewing FIR filter. However, in this example, since the outer MZ modulator is not optimally biased, the distance between the points of minimum power on the two curves (the difference between the corresponding skew amounts) is not equal to one symbol. For example, the difference between the two curves shown as 610 is greater than one symbol (approximately 36 ps), and the difference between the two curves shown as 612 is less than one symbol (approximately 28 ps).

As illustrated in this example, when the bias of the outer MZ modulator is not optimal, therefore the two positive and negative first harmonics are not orthogonal. Instead, the presence of a bias error in the outer MZ modulator may be reflected in the signals as an equal but opposite shifting of the signals.

Figure 7:
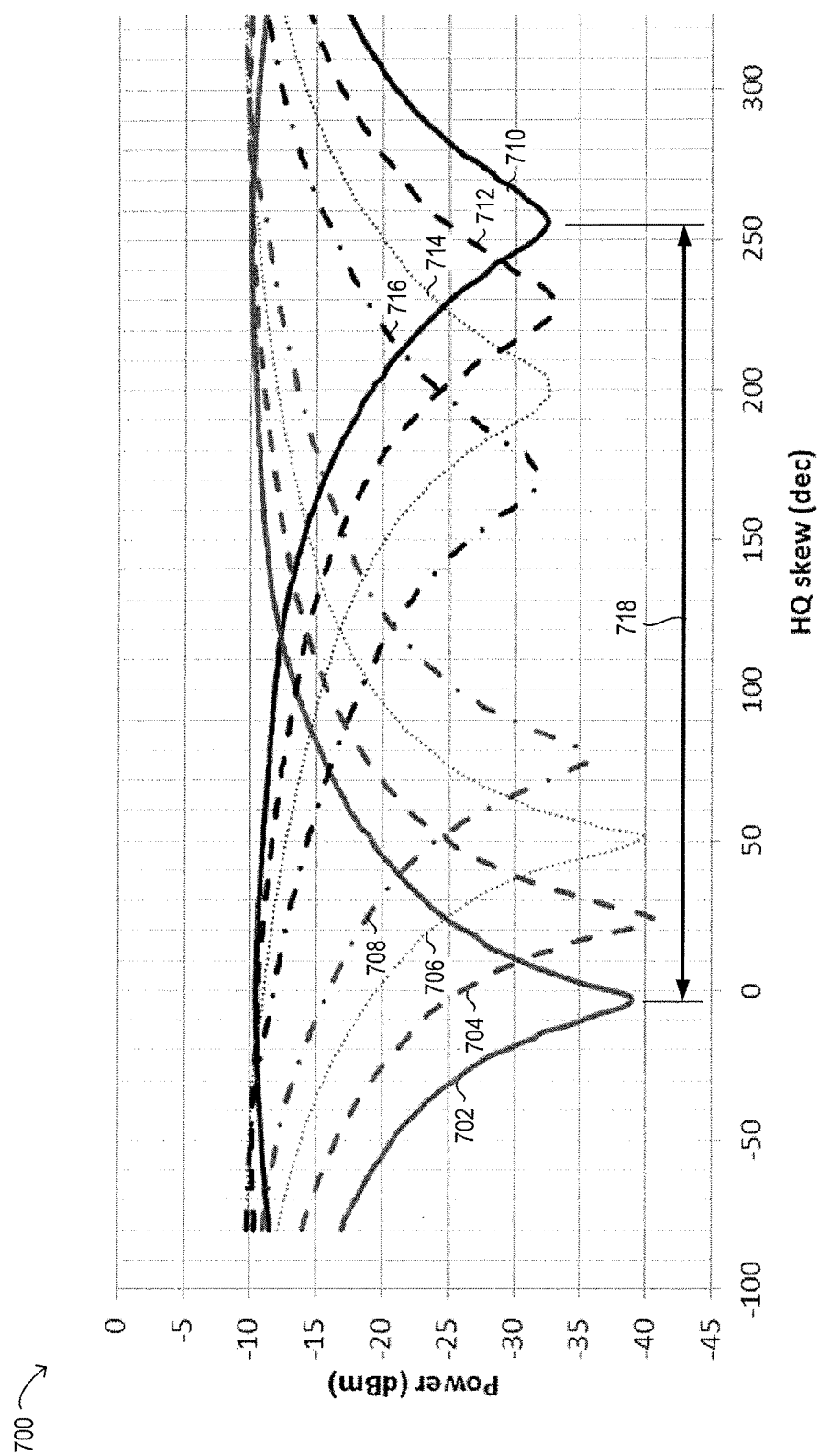
FIG. 7 illustrates optical power measurements with different bias voltages on the outer Mach-Zehnder modulator of an optical coherent transponder, according to at least some embodiments.

FIG. 7 illustrates example optical power measurements of the first harmonics of an optical signal when there are different bias voltages on the outer Mach-Zehnder modulator of an optical coherent transponder, according to at least some embodiments. In this example, the curves 702, 704, 706, and 708 in graph 700 represent measurements for the negative first harmonic (the higher frequency side of the spectrum) taken with decreasing bias voltages. The curves 710, 712, 714, and 716 represent measurements for the positive first harmonic (the lower frequency side of the spectrum) taken with decreasing bias voltages. In this example, the abscissa for each graph is shown in "skew steps", where one step corresponds to 0.125 ps. In this example, curves 702 and 710 represent measurements taken with a nominal bias voltage on the outer MZ modulator. With this bias voltage, the minimum power measurements between the two curves 702 and 710 correspond to skew amounts that are separated by one symbol (shown as 718). However, when the phase shift between the I/Q components is not exactly $\pi/2$ (90 degrees), the minimum power measurements between the two curves correspond to skew amounts that are separated by an amount other than one representing one symbol.

Graph 700 illustrates that changing the bias voltage of the outer MZ modulator introduces non-orthogonality between the two signals, causing the corresponding curves to shift. In this example, curves 704 and 712 represent measurements taken with a bias voltage that is 90% of the nominal bias voltage, curves 706 and 714 represent measurements taken with a bias voltage that is 80% of the nominal bias voltage, and curves 708 and 716 represent measurements taken with a bias voltage that is 70% of the nominal bias voltage. As illustrated in this example, the curves representing measurements of the optical power of the positive and negative first harmonics in the presence of the same bias voltage value shift closer to each other near the minimum power measurement points as the bias voltage value is decreased. For example, curves 704 and 712 are closer together than are curves 702 and 710. Similarly, curves 706 and 714 are closer together than are curves 704 and 712, and curves 708 and 716 are closer together than curves 706 and 714.

As noted above, mathematical models may be developed that describe the variation in the optical power of the first harmonics of an optical signal as a function of the I/Q skew and the I/Q phase difference introduced by the outer MZ modulator. Note that the value of the optical power corresponds to the square of the complex modulus of the output slow varying envelope electrical field. One embodiment of this mathematical model is shown below. In this example embodiment, the model describes the output slow varying envelope electrical field of the positive first harmonic $F(SK, \Phi)$ as a function of the I/Q skew SK and of the I/Q phase $\Phi$ introduced by the outer MZ as follows:

$$fmz(SK)=1-g+2\sqrt{g}\cdot\cos[A\cdot\sin(\omega t+SK)]$$

$$T(SK,\Phi)=fmz(0)+fmz(SK)\cdot[\cos(\Phi)+i\cdot\sin(\Phi)]$$

In at least some embodiments of the present disclosure, by applying the expansion in modified Bessel functions to $T(SK, \Phi)$, it is possible to derive the expression of $F(SK, \Phi)$ for the negative first harmonic as shown below. Note that expression of $F(SK, \Phi)$ for the positive first harmonic may be described using a similar expression.

$$F(SK,PH)=h1\cdot\cos(\Phi)\cdot\sin(SK)+h2\cdot\sin(\Phi)\cdot\sin(SK)+h3\cdot\cos(\Phi)\cdot\cos(SK)+h4\cdot\cos(SK)\cdot\sin(\Phi)$$

In these equations, fmz(SK) represents the output slow varying envelope electrical field of the outer MZ modulator when a sinusoidal modulation of frequency $\omega$ is applied; A represents a coefficient that depends on the symbols of the constellation corresponding to the 010101 sequence (in this example, $A=0.7\pi$); $T(SK, \Phi)$ represents the total output slow varying envelope electrical field; and h1, h2, h3, and h4 represent numerical complex coefficients.

Figure 8A:
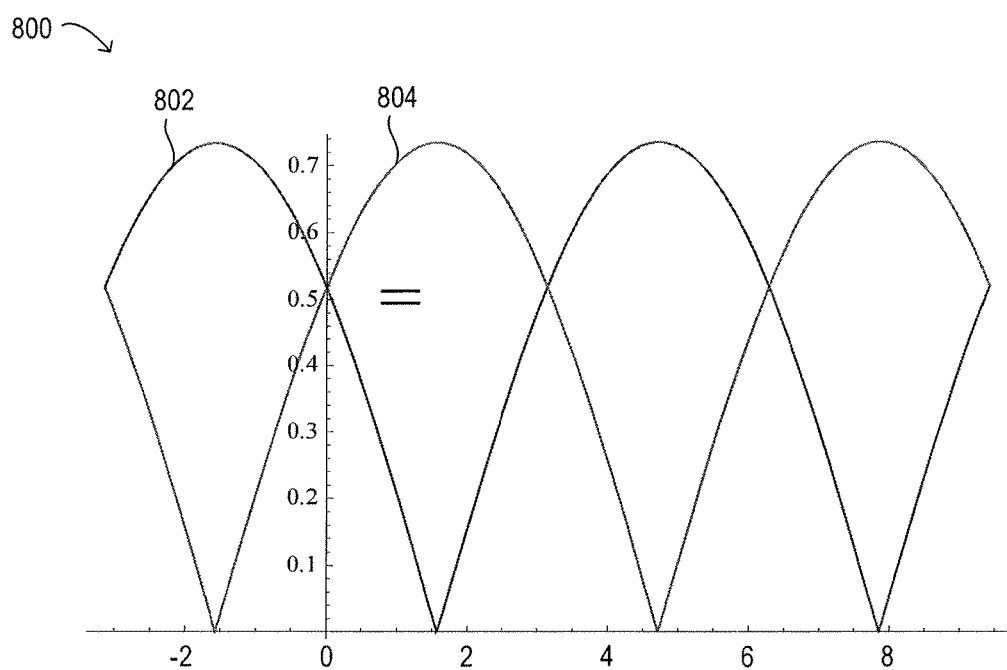
FIG. 8A-8C illustrate example mathematical models of the optical power of first harmonics for different I/Q phase values ($\phi$) (normalized), according to at least some embodiments.
Figure 8B:
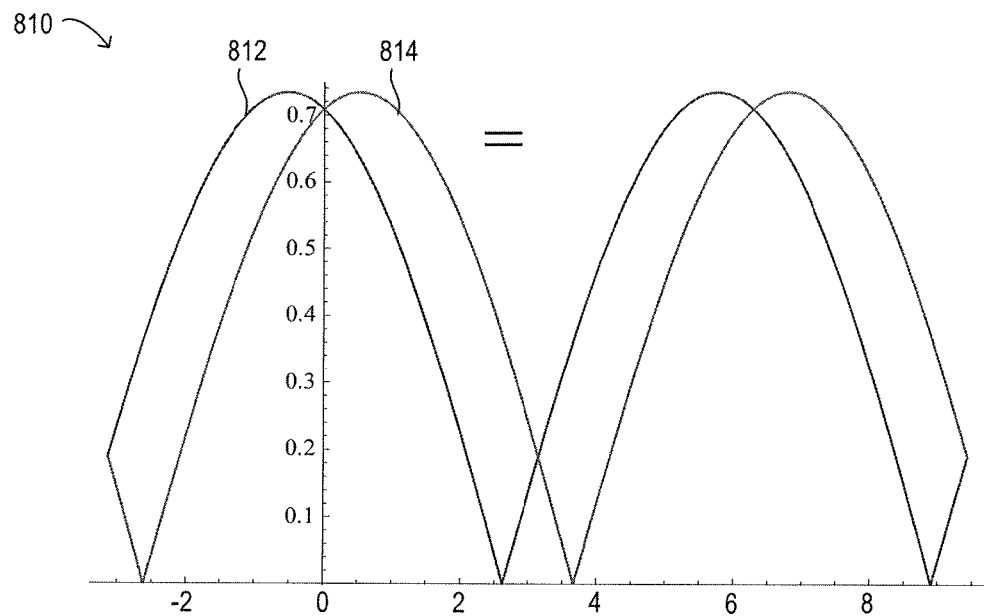
Figure 8C:
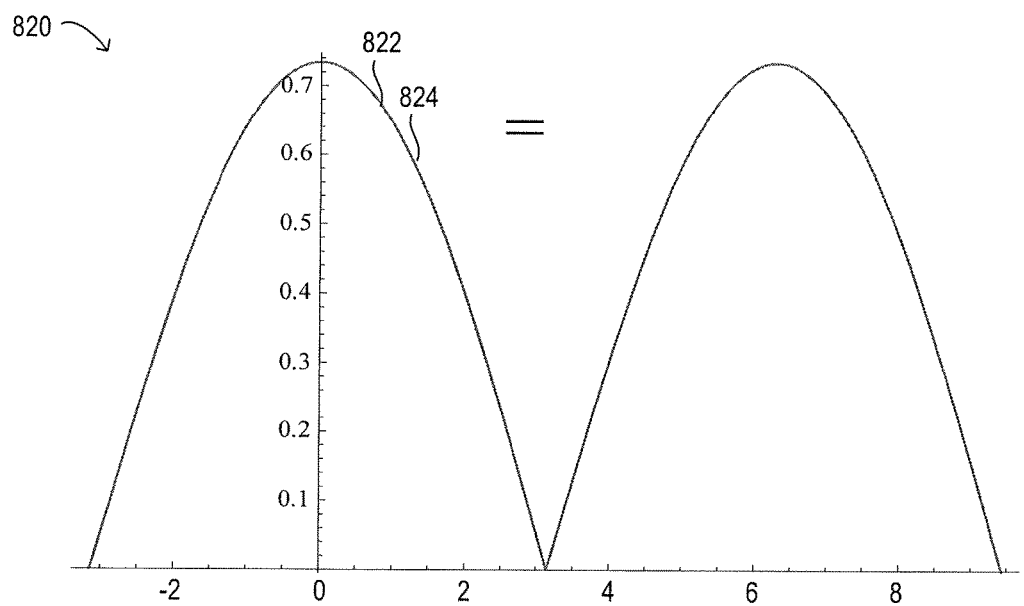

FIG. 8A-8C illustrate example mathematical models of the optical power of first harmonics (normalized) for different normalized I/Q phase values ($\phi$), according to at least some embodiments. More specifically, graph 800 in FIG. 8A illustrates an example in which curves 802 and 804 (which represent the positive and negative first harmonics of an optical signal transmitted by an optical coherent transponder) exhibit an I/Q phase value of $\phi=\pi/2$. In other words, curves 802 and 804 are orthogonal, which may indicate the presence of a correctly biased outer MZ modulator in the optical coherent transponder. Graph 810 in FIG. 8B illustrates an example in which curves 812 and 814 (which represent the positive and negative first harmonics of an optical signal transmitted by an optical coherent transponder) exhibit an I/Q phase value of $\phi=\pi/6$. In other words, curves 812 and 814 are not orthogonal, which may indicate the presence of a bias error in the outer MZ modulator in the optical coherent transponder. Graph 820 in FIG. 8C illustrates an example in which curves 822 and 824 (which represent the positive and negative first harmonics of an optical signal transmitted by an optical coherent transponder) exhibit an I/Q phase value of $\phi=0$. In this case, curves 822 and 824 are completely in phase, rather than being orthogonal, as desired, indicating that the I and Q components are parallel, rather than orthogonal. As described herein, the different I/Q phase values illustrated in the graphs in FIGS. 8A-8C may be dependent, at least in part, on the value of the bias voltage in the outer MZ modulator in the optical coherent transponder.

Figure 9:
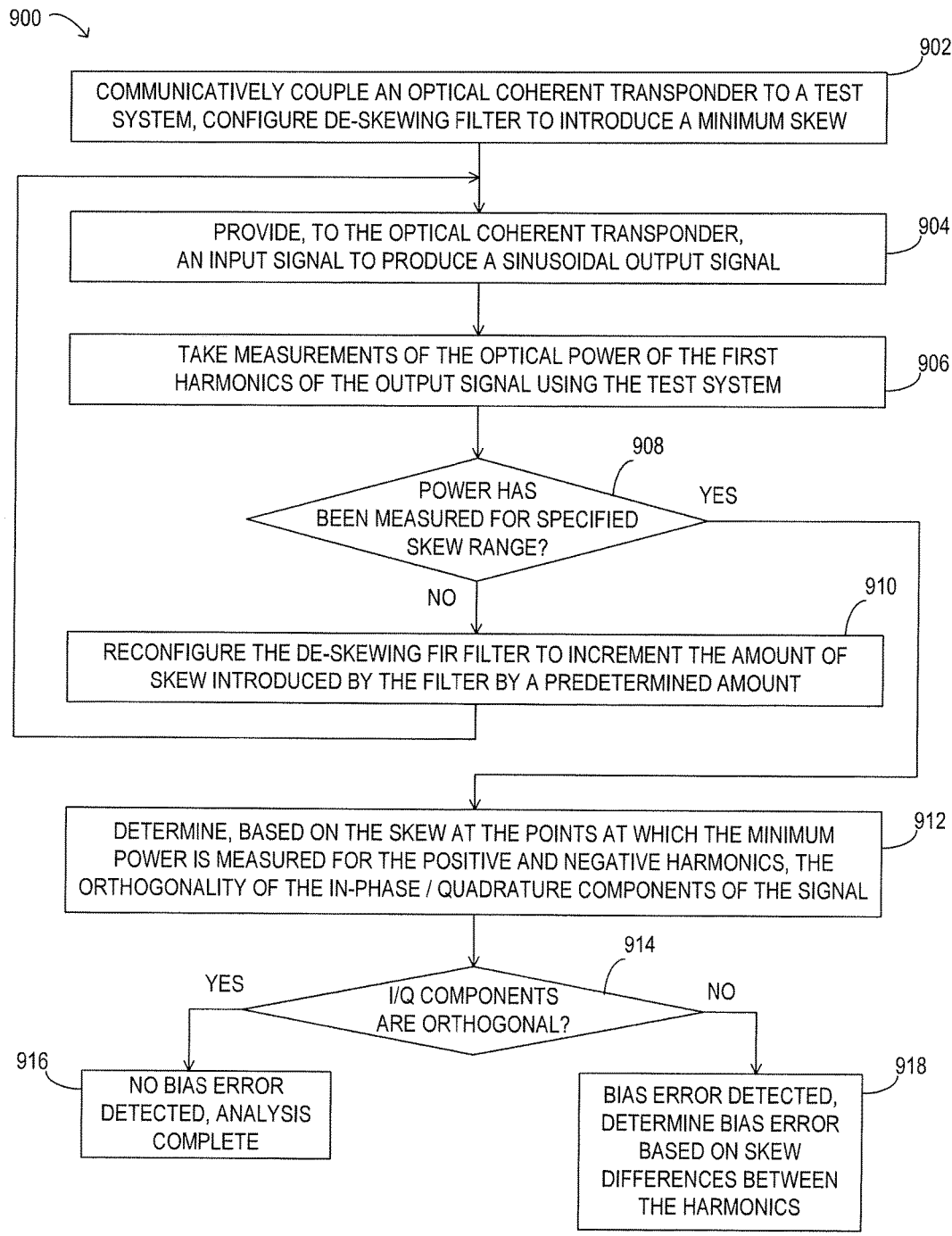
FIG. 9 is a flow diagram illustrating selected elements of a method for determining a bias error in an outer Mach-Zehnder modulator of an optical coherent transponder, according to at least some embodiments.

FIG. 9 is a flow diagram illustrating selected elements of a method 900 for determining a bias error in an outer Mach-Zehnder modulator of an optical coherent transponder, according to at least some embodiments. In this example embodiment, the method may include (at 902) communicatively coupling an optical coherent transponder to a test system, and configuring its de-skewing filter to introduce a minimum amount of skew. The method may include (at 904) providing, to the optical coherent transponder, an input signal to produce a periodic output signal that is generally sinusoidal (or is a combination of generally sinusoidal signals). For example, a local traffic generator of the transponder may be set to generate an input signal representing a series that includes alternating values of zeros and ones (e.g., 01010101, and so on) on both the in-phase and quadrature components of one of the channels (polarizations).

As illustrated in this example, the method may include (at 906) taking measurements of the optical power of the first harmonics of the output signal using the de-skewing system. In various embodiments, this may include, for example, taking a measurement of the optical power of the positive first harmonic ($f_c-f_0$) and the negative first harmonic ($f_c+f_0$). If (at 908), the optical power has not yet been measured for all of the possible amounts of skew that can be introduced by the de-skewing FIR filter in a specified skew range of interest, the method may include (at 910), reconfiguring the de-skewing FIR filter to increment the amount of skew introduced by the de-skewing FIR filter by a predetermined amount. For example, the de-skewing FIR filter may be configurable (e.g., physically, manually) or programmable to change the amount of skew that it introduces into the optical signal. In various embodiments, changing the amount of skew introduced by the de-skewing FIR filter may or may not include de-coupling the transponder from the test system and then re-coupling it to the test system (not shown). After reconfiguring the de-skewing FIR filter, the method may include repeating the operations shown in elements 904 and 906 one or more times to obtain measurements of the optical power of the first harmonics of the output signal while different amounts of skew are introduced by the de-skewing FIR filter. For example in some embodiments, power measurements may be taken for skew amounts in a range that is two symbols wide, beginning with the least possible amount of skew that can be introduced by the de-skewing filter and incrementing the amount of skew by a small fixed increment for each successive measurement.

If, or once (at 908), the power has been measured for all of the possible amounts of skew that can be introduced by the de-skewing FIR filter in the skew range of interest, the method may include (at 912) determining, based on the amount of skew that was introduced by the de-skewing FIR filter at the points at which the minimum optical power is measured for the positive and negative harmonics, the orthogonality of the in-phase/quadrature (I/Q) components of the signal. For example, if the difference between the two skew amounts is equal to one symbol, this may indicate that the I/Q components are orthogonal. However, if the difference between the two skew amounts is not equal to one symbol, this may indicate that the I/Q components are not orthogonal. If (at 914) it is determined that the I/Q components are orthogonal, there may be no bias error detected for the transponder, and the analysis may be complete (as in 916). On the other hand, if (at 914) it is determined that the I/Q components are not orthogonal, this may indicate that at bias error has been detected for the transponder. In this case, the method may include (at 918), determining the bias error based on skew differences between the harmonics.

In at least some embodiments of the present disclosure, if a bias error in the outer MZ modulator of an optical coherent transponder is detected, the bias voltage of the modulator may be adjusted to correct for the bias error. For example, in some cases, the transponder may include a programmable register or a location in a non-volatile memory (e.g., an EPROM or EEPROM) whose value controls the actual (physical) bias voltage value of the outer MZ modulator. In these transponders, by writing a value to this register or memory location other than a value representing the nominal bias voltage, the bias error may be reduced or eliminated. In some embodiments, the transponder may include another programmable register or location in a non-volatile memory (e.g., an EPROM or EEPROM) whose value controls the amount of skew introduced by the de-skewing filter in the transponder. By modifying the values of one or both of these registers/locations, the performance of the transponder may be improved.

Figure 10:
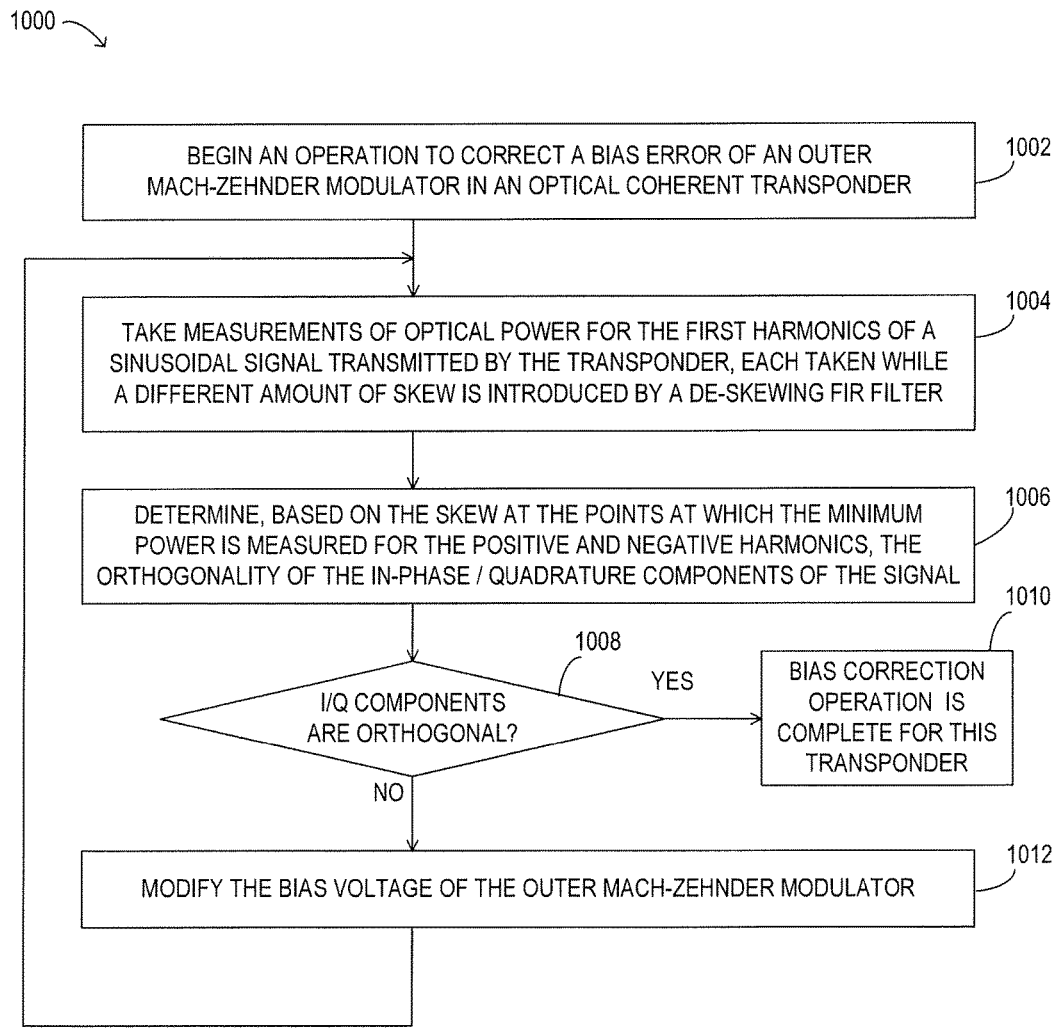
FIG. 10 is a flow diagram illustrating selected elements of a method for adjusting the bias voltage of an outer Mach-Zehnder modulator of an optical coherent transponder, according to at least some embodiments.

FIG. 10 is a flow diagram illustrating selected elements of a method 1000 for adjusting the bias voltage of an outer Mach-Zehnder modulator of an optical coherent transponder, according to at least some embodiments. As illustrated in this example embodiment, the method may include (at 1002) beginning an operation to correct a bias error of an outer Mach-Zehnder modulator in an optical coherent transponder. The method may include (at 1004) taking measurements of the optical power for the first harmonics of a sinusoidal signal (or a combination of sinusoidal signals) transmitted by the transponder. Each measurement may be taken while a different amount of skew is introduced by a de-skewing FIR filter in the transponder.

The method may include (at 1006) determining, based on the amount of skew introduced by the de-skewing FIR filter at the points at which the minimum power is measured for the positive and negative harmonics, the orthogonality of the in-phase/quadrature (I/Q) components of the signal. In some embodiments, this may include determining whether the two skew amounts differ by an amount representing one symbol or by some other amount (greater than or less than one symbol). If (at 1008) it is determined that the I/Q components are not orthogonal, the method may include (at 1012) modifying the bias voltage of the outer Mach-Zehnder modulator and repeating the operations shown in 1004 and 1006. The operations shown as 1012, 1004, and 1006 may be repeated one or more additional times if, after modifying the bias voltage of the outer Mach-Zehnder modulator, the I/Q components are still not orthogonal. If (or once) it is determined that the I/Q components are orthogonal (at 1008), the bias error correction operation may be complete for this transponder (as in 1010).

As described herein, in some embodiments of the present disclosure, an optical method may be used to correct bias errors in optical signals transmitted in an optical modulation format by an optical coherent transponder. The method may be more accurate than existing bias error correction methods and may employ much less expensive equipment than existing bias error correction methods. In at least some embodiments, the method may include repeatedly measuring the optical power of the positive and negative first harmonics of a signal in a complex modulated format that is transmitted by an optical coherent transponder under test while the amount of skew introduced by a de-skewing FIR filter in the transponder varies. The bias error correction operation may be performed in a test system that includes an optical power meter, one or more optical filters, and bias error correction logic/circuitry. The optical power measurements may be analyzed to identify the minimum optical power measurement, and to determine the amount of skew that was introduced by the de-skewing FIR filter in the transponder when the minimum optical power measurements were taken for the positive and negative first harmonics. By determining that the difference between the amounts of skew that were introduced when the minimum power measurements were taken, the test system may detect and/or measure a bias error in the outer MZ modulator. The bias voltage of the outer MZ modulator may be modified to apply bias offset to the outer MZ modulator to correct the bias error, and the bias offset amount may be dependent on the power measurements that were taken.

In some embodiments, the bias error correction methods described herein may be provided as a service to developers or manufacturers of transponders (including transponders that comply with C form-factor pluggable (CFP) multi-source agreements or variants thereof), or other types of equipment used in optical communication networks. For example, a service may be provided to correct bias errors in the prototypes of various products to ensure that they meet applicable requirements for I/Q orthogonality, using the test systems and methods described herein (e.g., test systems that include relatively low-cost optical filters and power meters, rather than more expensive equipment, such as OMAs).

While various test systems and bias error correction methods are described herein primarily in terms of their use in correcting bias errors in optical coherent transponders by analyzing measurements of the optical power of first harmonics of optical signals transmitted by the transponder, in other embodiments, the methods may include analyzing measurements of the optical power of other harmonics of the optical signals (e.g., second harmonics and beyond) instead of, or in addition to, analyzing measurements of the optical power of the first harmonics of the optical signals. In addition, while these test systems and bias error correction methods are described herein primarily in terms of their use in correcting bias errors in outer MZ modulators of optical coherent transponders, in other embodiments, these systems and techniques may be used to reduce bias errors in other types of systems that generate two phase-coherent optical signals (to be subsequently combined) and for which it may be useful to improve orthogonality. For example, these techniques may be applied in other types of systems that include MZ modulators to introduce a phase shift of $\pi/2$ radians to generate the orthogonal components of the optical signals. As in the case in which the method is used to correct bias errors in a transponder, the optimal bias voltage to cause the I/Q components in the system under test to be orthogonal may be determined by providing a sinusoidal input to the system, repeatedly measuring (using an optical power meter) the optical power of one or more harmonics of a sinusoidal output of the system while varying an amount of added skew, and (based on the skew being adding when the minimum power measurement are taken) detecting, measuring, and/or correcting these types of bias errors in the system.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for detecting a bias error in an optical coherent transponder, the method comprising:
   performing a first plurality of measurements of optical power of positive harmonics of an optical signal transmitted in an optical modulation format by the optical coherent transponder, each measurement being performed while a respective different amount of skew is introduced into the optical signal by a de-skewing filter of the optical coherent transponder;
   performing a second plurality of measurements of optical power of negative harmonics of the optical signal, each measurement being performed while a respective different amount of skew is introduced into the optical signal by a de-skewing filter of the optical coherent transponder;
   detecting, dependent on the first plurality of measurements and the second plurality of measurements, a bias error in a modulator in the optical coherent transponder that when correctly biased produces a constant phase offset of $\pi/2$ radians between in-phase and quadrature components of the optical signals transmitted by the optical coherent transponder, wherein the detecting includes determining that a curve representing the first plurality of measurements and a curve representing the second plurality of measurements are not orthogonal.

2. The method of claim 1, wherein determining that the curve representing the first plurality of measurements and the curve representing the second plurality of measurements are not orthogonal comprises:
   identifying a first minimum optical power value obtained during the first plurality of measurements;
   determining a first amount of skew that was introduced by the de-skewing filter when the first minimum optical power value was obtained;
   identifying a second minimum optical power value obtained during the second plurality of measurements;
   determining a second amount of skew that was introduced by the de-skewing filter when the second minimum optical power value was obtained; and
   determining that the first amount of skew and the second amount of skew differ by an amount other than an amount representing a one-symbol delay in the optical modulation format.

3. The method of claim 1, wherein:
   the method further comprises changing, in response to detecting the bias error in the modulator, a bias voltage of the modulator; and
   changing the bias voltage of the modulator reduces the bias error in the optical coherent transponder.

4. The method of claim 1, wherein:
   the method further comprises changing, in response to detecting the bias error in the modulator, a bias voltage of the modulator; and
   changing the bias voltage of the modulator comprises changing a value of a configurable operating parameter of the modulator.

5. The method of claim 1, further comprising:
   determining, dependent on the first plurality of measurements and the second plurality of measurements, a measurement of the bias error in the modulator.

6. The method of claim 1, further comprising:
   changing, in response to detecting the bias error in the modulator, a bias voltage of the modulator;

performing, subsequent to changing the bias voltage, a third plurality of measurements of optical power of positive harmonics of an optical signal transmitted in an optical modulation format by the optical coherent transponder, each measurement being performed while a respective different amount of skew is introduced into the optical signal by a de-skewing filter of the optical coherent transponder;

performing, subsequent to changing the bias voltage, a fourth plurality of measurements of optical power of negative harmonics of the optical signal, each measurement being performed while a respective different amount of skew is introduced into the optical signal by a de-skewing filter of the optical coherent transponder;

detecting, dependent on the third plurality of measurements and the fourth plurality of measurements, that the bias error in the modulator has been corrected, wherein detecting that the bias error in the modulator has been corrected includes determining that a curve representing the third plurality of measurements and a curve representing the fourth plurality of measurements are orthogonal.

7. The method of claim 1, wherein:
performing the first plurality of measurements comprises:
taking a first measurement of optical power of a positive harmonic of an optical signal transmitted by the optical coherent transponder while a first amount of skew is introduced by the de-skewing filter; and
for each successive one of the first plurality of measurements, varying the amount of skew introduced by the de-skewing filter by a fixed increment that is dependent on the minimum resolution by which the amount of skew is changeable;
performing the plurality of measurements comprises varying the amount of skew introduced by the de-skewing filter to include amounts of skew over a range of values that represents two symbols of delay in the optical modulation format.

8. The method of claim 1, wherein:
the optical signal transmitted by the optical coherent transponder is a sinusoidal signal or a combination of sinusoidal signals;
the method further comprises:
filtering the optical signal to isolate the positive harmonics of the optical signal prior to performing the first plurality of measurements; and
filtering the optical signal to isolate the negative harmonics of the optical signal prior to performing the second plurality of measurements.

9. The method of claim 1, wherein performing the first plurality of measurements and the second plurality of measurements comprises taking measurements of optical power using an optical power meter.

10. A system, comprising:
circuitry to:
receive optical signals transmitted in an optical modulation format by an optical coherent transponder under test;
an optical power meter comprising circuitry to:
perform a first plurality of measurements of optical power of positive harmonics of an optical signal transmitted by the optical coherent transponder, each measurement to be performed while a respective different amount of skew is introduced into the optical signal by a de-skewing filter of the optical coherent transponder;
perform a second plurality of measurements of optical power of negative harmonics of the optical signal, each measurement to be performed while a respective different amount of skew is introduced into the optical signal by a de-skewing filter of the optical coherent transponder;
a bias error corrector comprising circuitry to:
detect, dependent on the first plurality of measurements and the second plurality of measurements, a bias error in a modulator in the optical coherent transponder that when correctly biased produces a constant phase offset of $\pi/2$ radians between in-phase and quadrature components of the optical signals transmitted by the optical coherent transponder, including circuitry to determine that a curve to represent the first plurality of measurements and a curve to represent the second plurality of measurements are not orthogonal.

11. The system of claim 10, wherein to determine that the curve to represent the first plurality of measurements and the curve to represent the second plurality of measurements are not orthogonal, the bias error corrector further comprises circuitry to:
identify a first minimum optical power value obtained during the first plurality of measurements;
determine a first amount of skew that was introduced by the de-skewing filter when the first minimum optical power value was obtained;
identify a second minimum optical power value obtained during the second plurality of measurements;
determine a second amount of skew that was introduced by the de-skewing filter when the second minimum optical power value was obtained; and
determine that the first amount of skew and the second amount of skew differ by an amount other than an amount to represent a one-symbol delay in the optical modulation format.

12. The system of claim 10, wherein:
the bias error corrector further comprises circuitry to change a bias voltage of the modulator in response to detection of the bias error in the modulator, the change to effect a reduction of the bias error in the optical coherent transponder.

13. The system of claim 10, wherein:
the bias error corrector further comprises circuitry to change a bias voltage of the modulator in response to detection of the bias error in the modulator, including circuitry to change a value of a configurable operating parameter of the modulator.

14. The system of claim 10, wherein the bias error corrector further comprises circuitry to:
determine, dependent on the first plurality of measurements and the second plurality of measurements, a measurement of the bias error in the modulator.

15. The system of claim 10, wherein:
the bias error corrector comprises circuitry to:
change, in response to detection of the bias error in the modulator, a bias voltage of the modulator;
the optical power meter further comprises circuitry to:
perform, subsequent to the change to the bias voltage, a third plurality of measurements of optical power of positive harmonics of an optical signal transmitted in an optical modulation format by the optical coherent transponder, each measurement to be performed while a respective different amount of skew is introduced into the optical signal by a de-skewing filter of the optical coherent transponder;

perform, subsequent to the change to the bias voltage, a fourth plurality of measurements of optical power of negative harmonics of the optical signal, each measurement to be performed while a respective different amount of skew is introduced into the optical signal by a de-skewing filter of the optical coherent transponder;

the bias error corrector further comprises circuitry to:

detect, dependent on the third plurality of measurements and the fourth plurality of measurements, that the bias error in the modulator has been corrected, including circuitry to determine that a curve to represent the third plurality of measurements and a curve to represent the fourth plurality of measurements are orthogonal.

16. The system of claim 10, wherein:

to perform the first plurality of measurements, the optical power meter comprises circuitry to:

take a first measurement of optical power of a positive harmonic of an optical signal transmitted by the optical coherent transponder while a first amount of skew is introduced by the de-skewing filter; and for each successive one of the first plurality of measurements, vary the amount of skew introduced by the de-skewing filter by a fixed increment that is dependent on the minimum resolution by which the amount of skew is changeable, such that the amount of skew introduced by the de-skewing filter is varied over a range of values that represents two symbols of delay in the optical modulation format.

17. The system of claim 10, wherein:

the optical signal transmitted by the optical coherent transponder is a sinusoidal signal or a combination of sinusoidal signals;

the system further comprises one or more filters to:

isolate the positive harmonics of the optical signal prior to performance of the first plurality of measurements; and isolate the negative harmonics of the optical signal prior to performance of the second plurality of measurements.

18. The system of claim 10, wherein the optical power meter comprises an optical spectrum analyzer.

19. A method for correcting a bias error in an optical coherent transponder, comprising:

performing a first plurality of measurements of optical power of positive harmonics of an optical signal transmitted in an optical modulation format by the optical coherent transponder, each measurement being performed while a respective different amount of skew is introduced into the optical signal by a de-skewing filter of the optical coherent transponder;

performing a second plurality of measurements of optical power of negative harmonics of the optical signal, each measurement being performed while a respective different amount of skew is introduced into the optical signal by a de-skewing filter of the optical coherent transponder;

detecting, dependent on the first plurality of measurements and the second plurality of measurements, a bias error in a modulator in the optical coherent transponder that when correctly biased produces a constant phase offset of $\pi/2$ radians between in-phase and quadrature components of the optical signals transmitted by the optical coherent transponder;

determining a bias voltage value for the modulator that corrects the bias error; and changing the bias voltage of the modulator to the determined bias voltage value.

20. The method of claim 19, wherein determining the bias voltage value for the modulator that corrects the bias error comprises:

changing, in response to detecting the bias error in the modulator, an initial value of the bias voltage of the modulator to a modified bias voltage value;

performing, subsequent to changing the initial value of the bias voltage of the modulator to a modified bias voltage value, a third plurality of measurements of optical power of positive harmonics of an optical signal transmitted in an optical modulation format by the optical coherent transponder, each measurement being performed while a respective different amount of skew is introduced into the optical signal by a de-skewing filter of the optical coherent transponder;

performing, subsequent to changing the initial value of the bias voltage of the modulator to a modified bias voltage value, a fourth plurality of measurements of optical power of negative harmonics of the optical signal, each measurement being performed while a respective different amount of skew is introduced into the optical signal by a de-skewing filter of the optical coherent transponder;

detecting, dependent on the third plurality of measurements and the fourth plurality of measurements, that the bias error in the modulator has been corrected, wherein detecting that the bias error in the modulator has been corrected includes determining that a curve representing the third plurality of measurements and a curve representing the fourth plurality of measurements are orthogonal.

* * * * *